US012297044B2

(12) United States Patent
Fan et al.

(10) Patent No.: US 12,297,044 B2
(45) Date of Patent: May 13, 2025

(54) BAGGAGE MANAGEMENT SYSTEM AND A METHOD FOR BAGGAGE MANAGEMENT

(71) Applicant: Logistics and Supply Chain MultiTech R&D Centre Limited, Pok Fu Lam (HK)

(72) Inventors: Ka Lun Fan, Pok Fu Lam (HK); Chung Hang Leung, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 703 days.

(21) Appl. No.: 17/566,771

(22) Filed: Dec. 31, 2021

(65) Prior Publication Data

US 2023/0211951 A1 Jul. 6, 2023

(51) Int. Cl.
*B65G 1/137* (2006.01)
*B60P 1/52* (2006.01)
*B64F 1/36* (2024.01)
*B65G 1/04* (2006.01)
*B65G 1/06* (2006.01)
*B65G 13/02* (2006.01)
(Continued)

(52) U.S. Cl.
CPC ............... *B65G 1/137* (2013.01); *B60P 1/52* (2013.01); *B64F 1/366* (2013.01); *B65G 1/0492* (2013.01); *B65G 1/065* (2013.01); *B65G 1/1371* (2013.01); *B65G 13/02* (2013.01); *G05D 1/0217* (2013.01); *G05D 1/0289* (2013.01); *G05D 1/0297* (2013.01); *G06Q 50/40* (2024.01); *G07C 9/37* (2020.01); *B65G 2201/0264* (2013.01)

(58) Field of Classification Search
CPC ...... B65G 1/137; B65G 1/0492; B65G 1/065; B65G 1/1371; B65G 13/02; B65G 2201/0264; B65G 1/12; B60P 1/52; B64F 1/366; G05D 1/0217; G05D 1/0289; G05D 1/0297; G06Q 50/40; G06Q 10/083
See application file for complete search history.

(56) References Cited

U.S. PATENT DOCUMENTS 9,558,472 B1 * 1/2017 Tubilla Kuri .......... B25J 9/0093
2008/0145197 A1 * 6/2008 Taylor .................... B65G 1/023
414/276
(Continued)

*Primary Examiner* — Thomas Randazzo
(74) *Attorney, Agent, or Firm* — Renner, Kenner, Greive, Bobak, Taylor & Weber

(57) ABSTRACT

A baggage management system includes: a storage rack including a plurality of receptacles shaped and structured to retain one or more baggage items; a baggage transportation system including a plurality of automated guided vehicles (AGVs) configured to transport one or more baggage items between a pick up point, a drop off point, and the storage rack, each AGV including a a wireless communication unit and a controller configured to control movement of the specific AGV based on received control instructions; and a baggage administration server including a processor, a memory unit, and a wireless communication interface, and configured to receive a request to store or retrieve a baggage item from the storage rack, determine the position of the one or more AGVs, identify the one or more AGVs required to either store or retrieve a baggage item as defined in the request, and transmit control instructions to the AGVs.

22 Claims, 17 Drawing Sheets

(51) Int. Cl.
*G05D 1/00* (2006.01)
*G06Q 50/40* (2024.01)
*G07C 9/37* (2020.01)

(56) References Cited

U.S. PATENT DOCUMENTS

| | | | | |
|---|---|---|---|---|
| 2010/0207780 | A1* | 8/2010 | Newton | G06Q 10/08 |
| | | | | 340/539.13 |
| 2011/0142581 | A1* | 6/2011 | Freudelsperger | B65G 1/1378 |
| | | | | 414/807 |
| 2011/0231212 | A1* | 9/2011 | Hurley | G06Q 10/02 |
| | | | | 705/5 |
| 2015/0039354 | A1* | 2/2015 | Murphy | G06Q 10/02 |
| | | | | 705/5 |
| 2017/0200248 | A1* | 7/2017 | Murphy | G06Q 10/08 |
| 2020/0277137 | A1* | 9/2020 | Bastian, II | B66F 9/065 |
| 2020/0334630 | A1* | 10/2020 | Al Issa | G06Q 10/02 |
| 2021/0056788 | A1* | 2/2021 | Chen | G07C 9/00896 |
| 2021/0072754 | A1* | 3/2021 | Senske | B60P 3/00 |
| 2021/0114729 | A1* | 4/2021 | Ragan | B64D 9/00 |
| 2021/0117527 | A1* | 4/2021 | Behm | G07C 9/37 |
| 2021/0284358 | A1* | 9/2021 | Cottle | B64F 1/368 |
| 2021/0304117 | A1* | 9/2021 | Kondo | G06Q 10/083 |
| 2021/0316945 | A1* | 10/2021 | Lui | B60P 3/007 |
| 2021/0342966 | A1* | 11/2021 | Watanabe | G06Q 10/06315 |
| 2022/0009712 | A1* | 1/2022 | Kilibarda | B65G 1/0492 |
| 2022/0105854 | A1* | 4/2022 | Matsushita | G05D 1/0297 |
| 2022/0406068 | A1* | 12/2022 | Kawase | G06Q 50/265 |
| 2023/0041684 | A1* | 2/2023 | Nako | B65G 1/0492 |
| 2023/0113395 | A1* | 4/2023 | Kawase | G07B 15/00 |
| | | | | 726/16 |
| 2024/0010355 | A1* | 1/2024 | Al-Eryani | G06Q 10/025 |

* cited by examiner

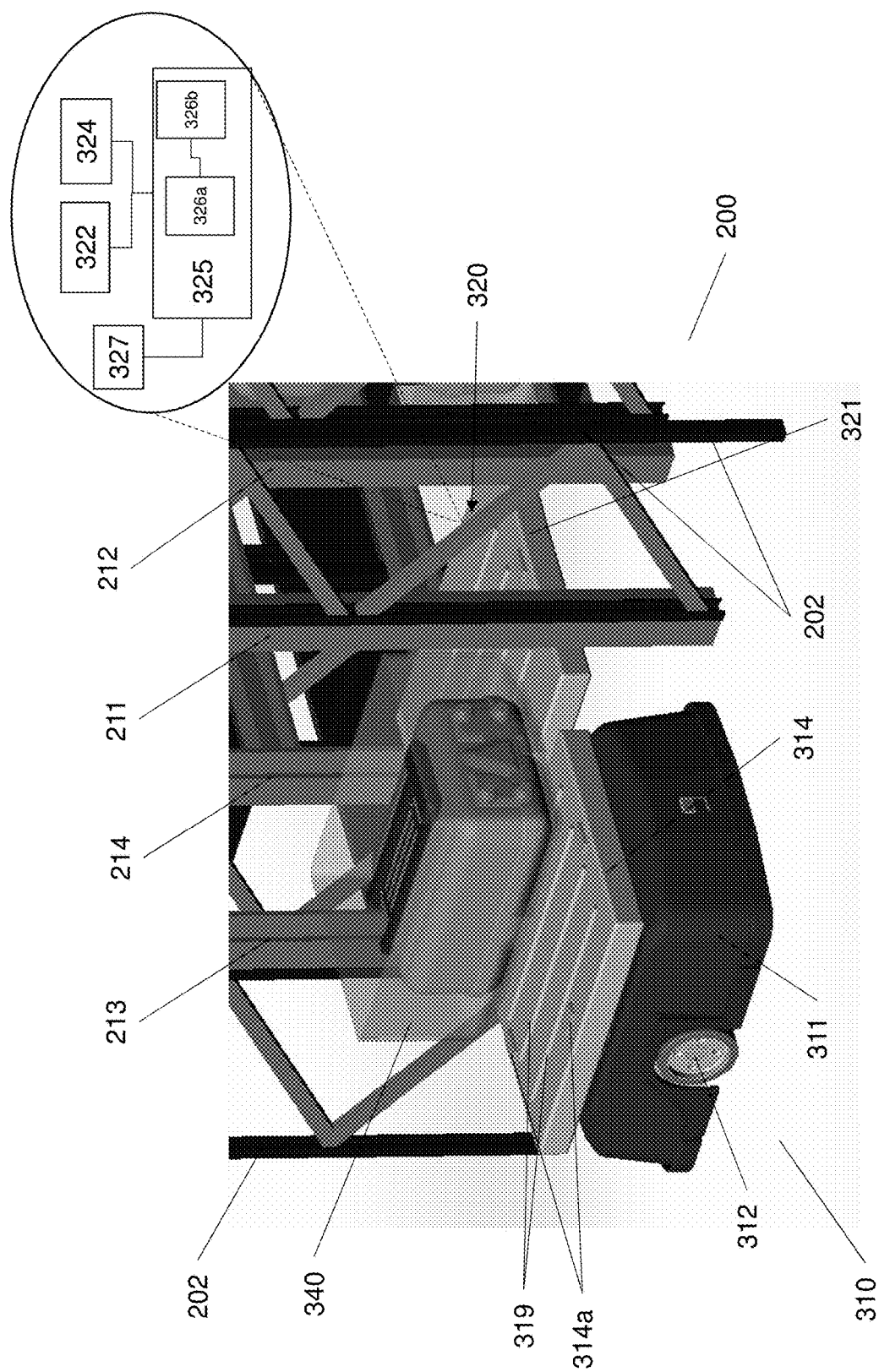

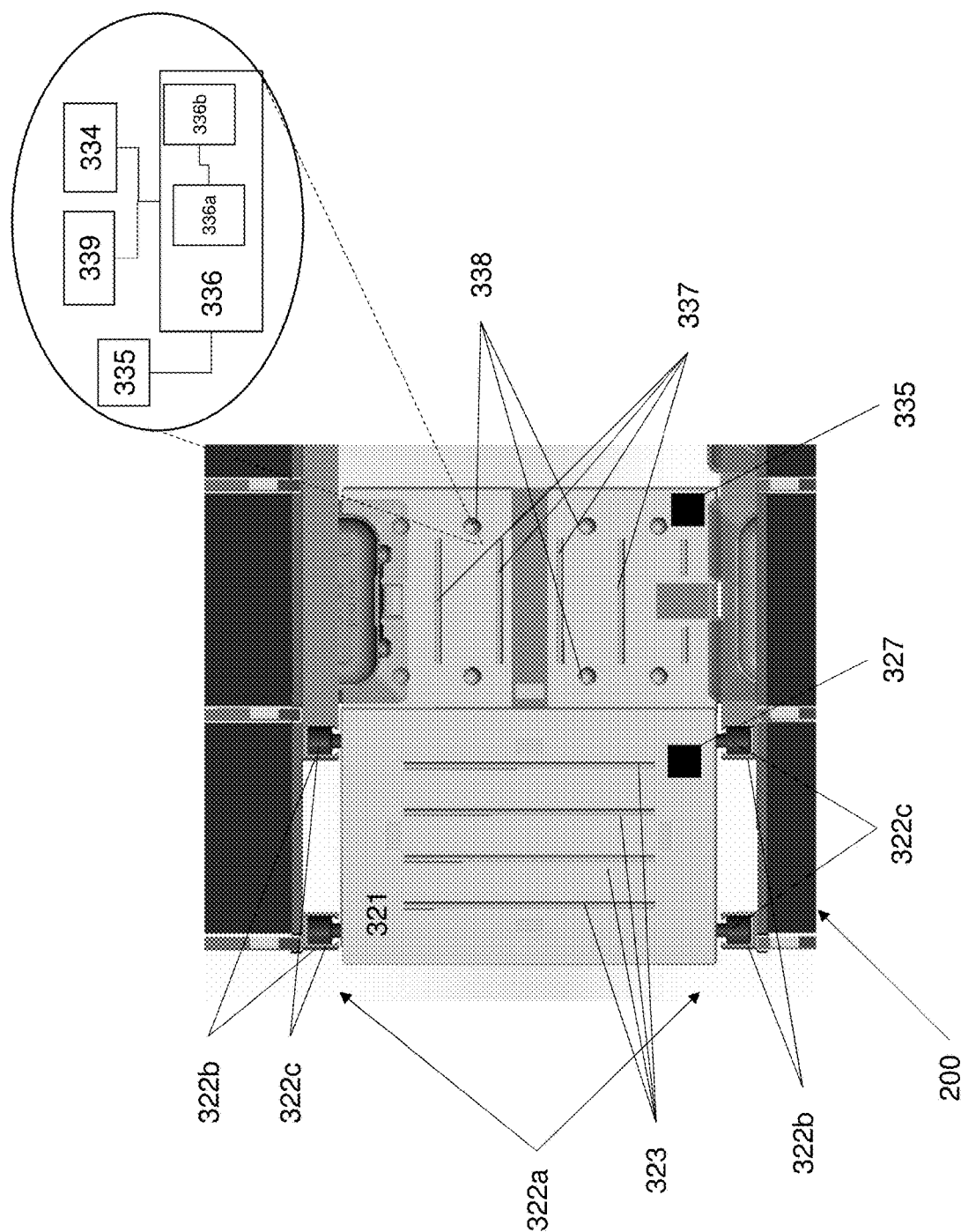

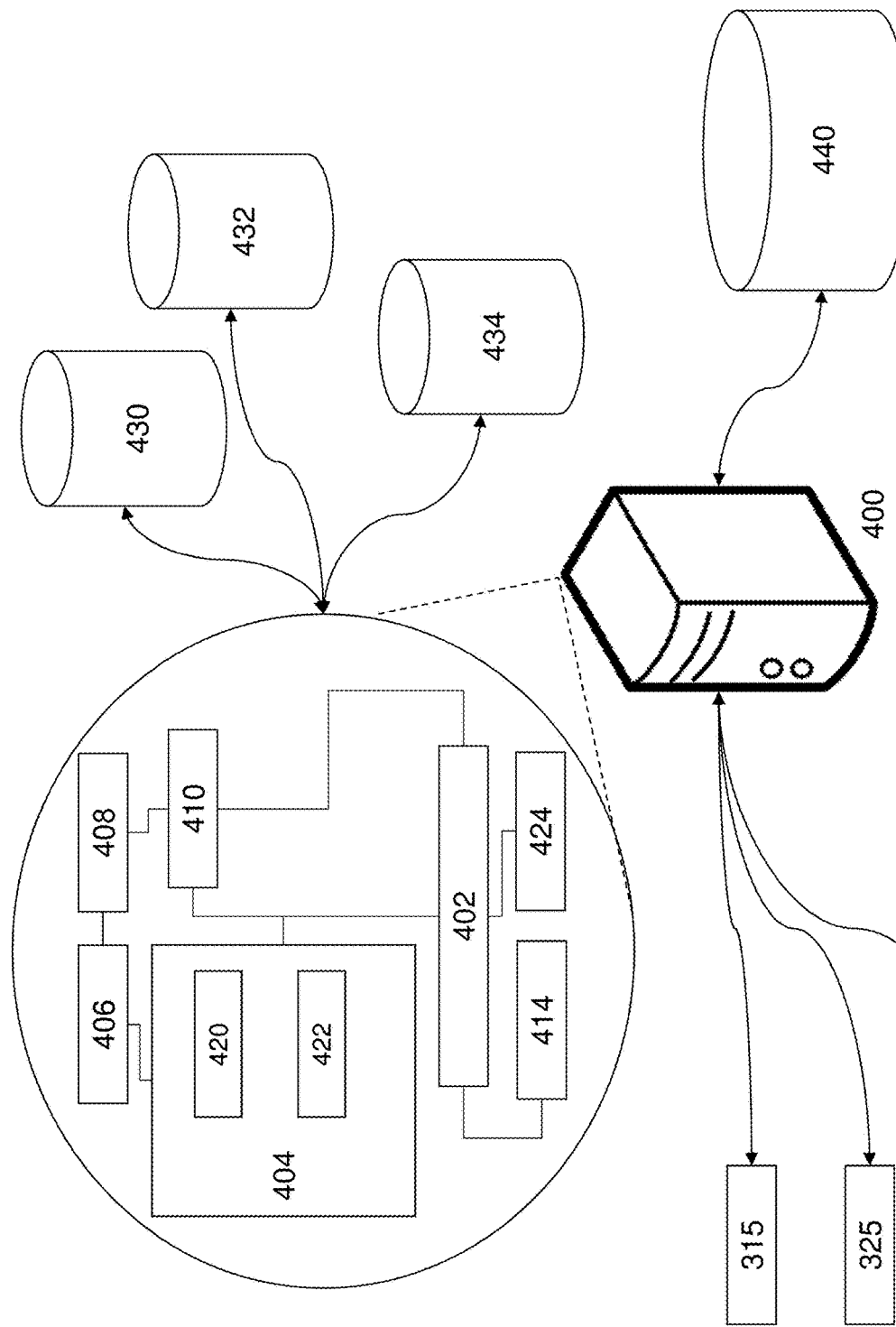

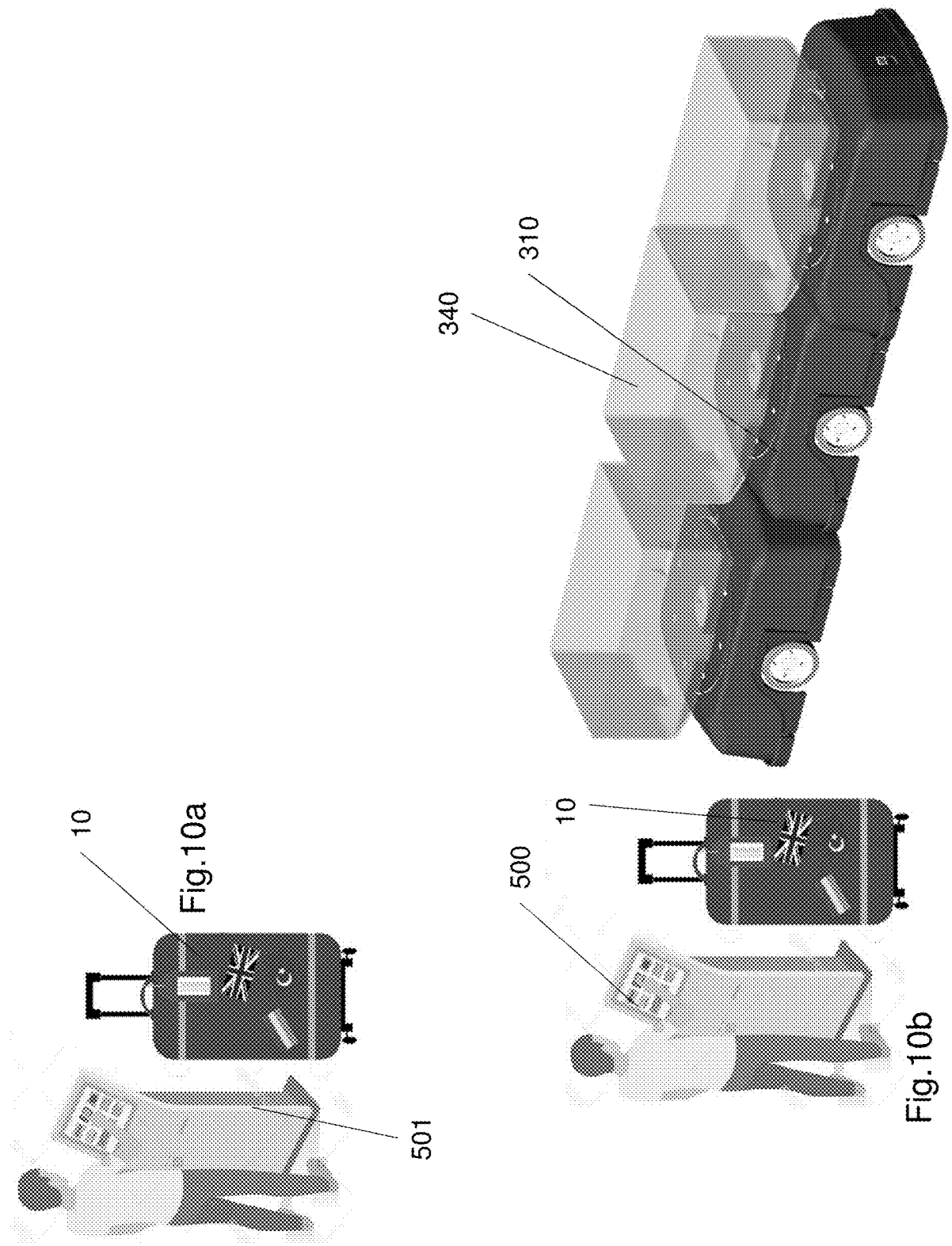

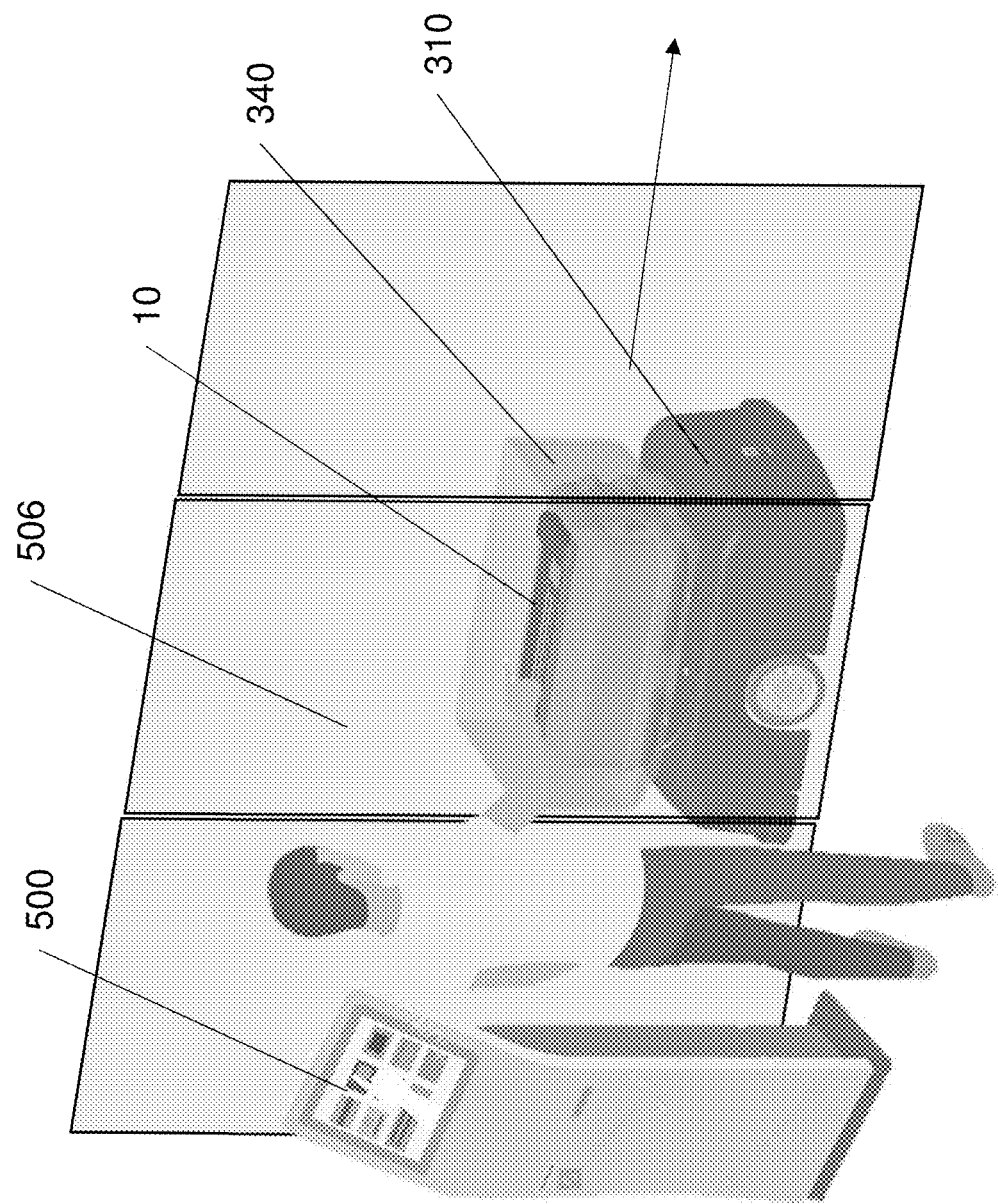

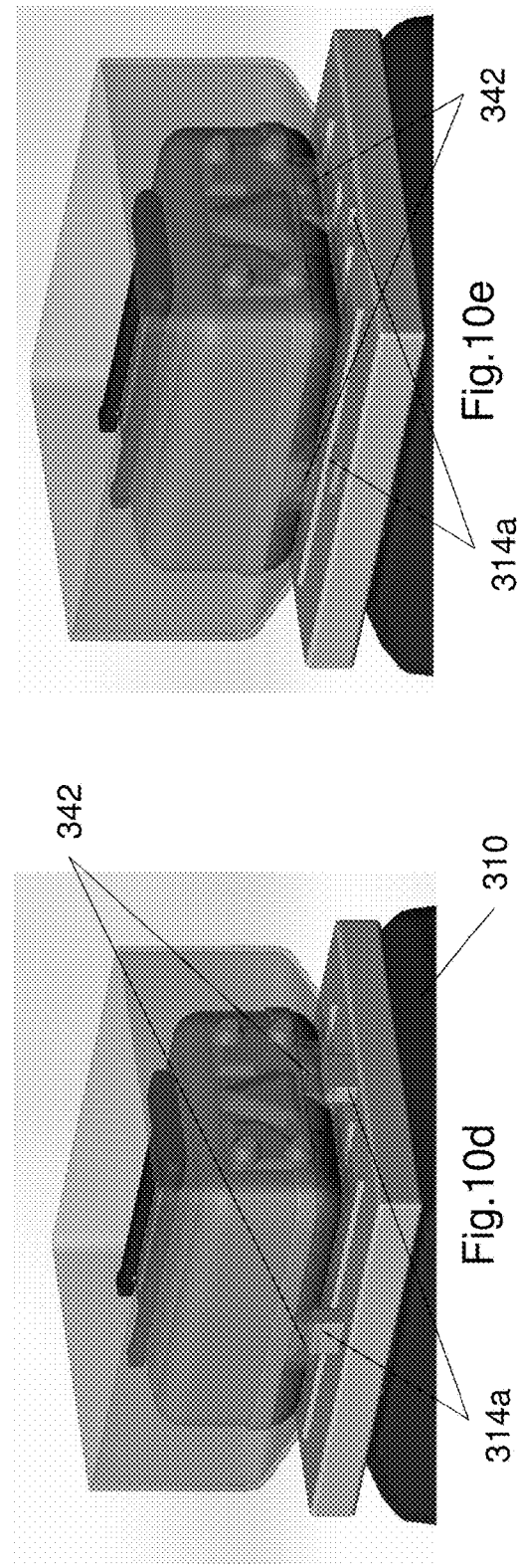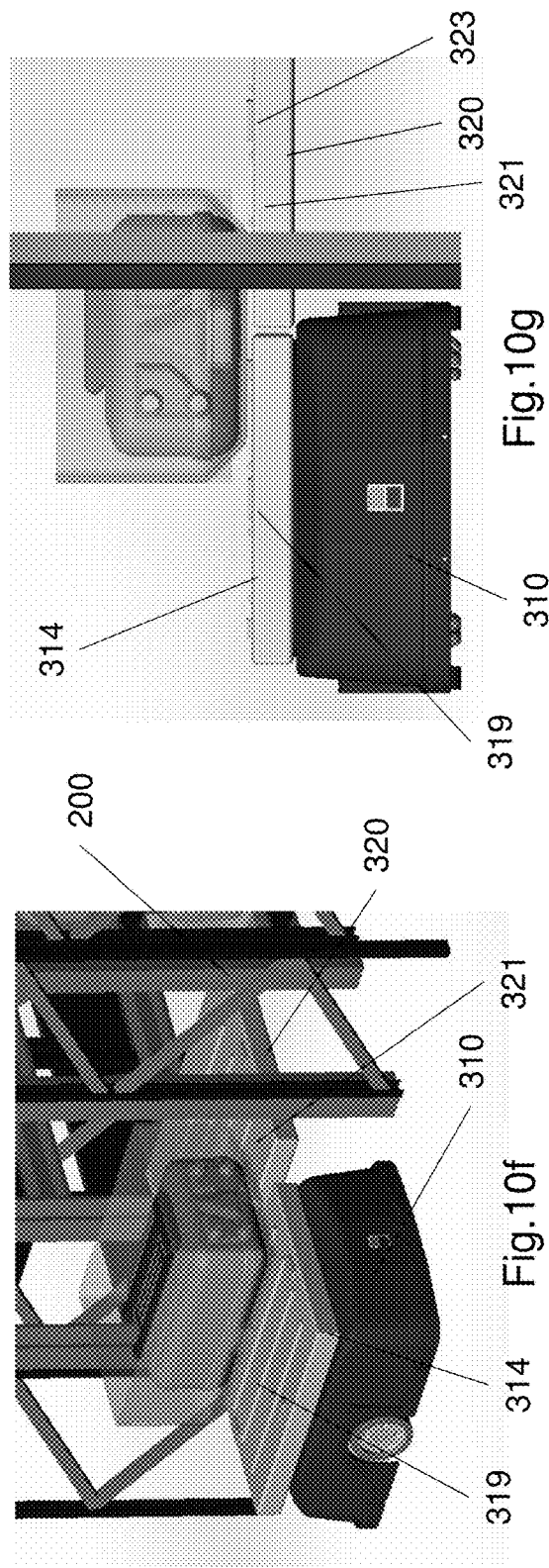

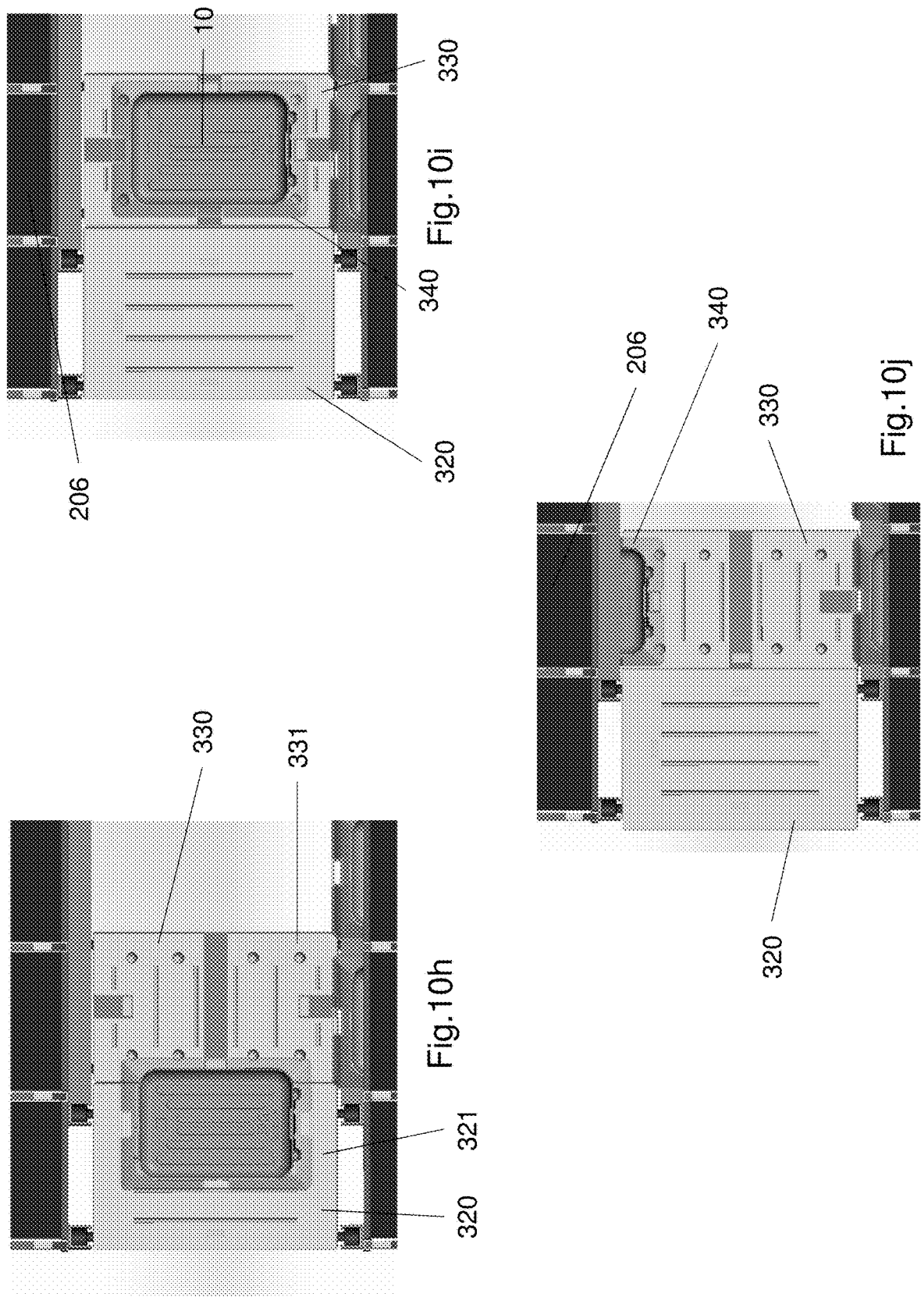

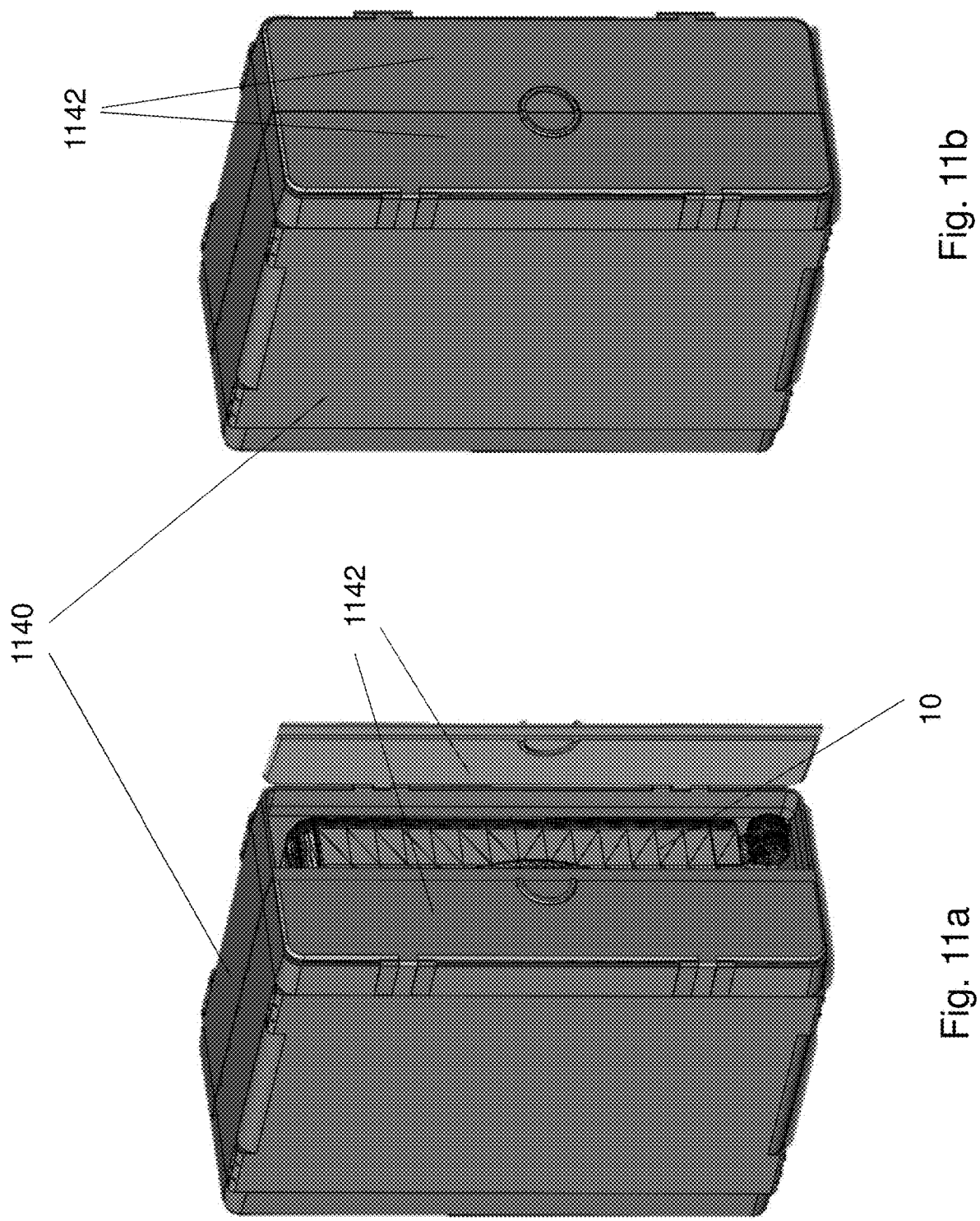

BAGGAGE MANAGEMENT SYSTEM AND A METHOD FOR BAGGAGE MANAGEMENT

TECHNICAL FIELD

The present disclosure relates to a baggage management system and a method for baggage management. In particular, the present disclosure relates to an automated baggage management system and an automated method of baggage management to facilitate automatic baggage storage and/or retrieval.

BACKGROUND

Baggage storage is a requirement in several different cases. Some examples are hotels and airports where a customer's baggage needs to be stored for a set period of time. A customer's baggage may be required to be stored for a time specified by the customer. Several modern baggage storage systems still utilize people to collect and store a customer's bags. Other baggage systems use robots to automate storage of bags. One example is ABB robotics system titled "Yobot", which is used in concierge baggage storage. The Yobot system has limitations in its size and the number of bags that can be stored.

SUMMARY OF THE INVENTION

The present disclosure relates to a baggage system for managing the handling, storage and retrieval of baggage. In particular, the present disclosure relates to an automated baggage system for automatically managing the handling, storage and retrieval of baggage with minimal human input. The automated baggage system allows for several customer bags to be stored or retrieved simultaneously. The baggage system disclosed herein can be applied to other goods and items besides baggage. The disclosed system is particularly useful in storing, handling and retrieving baggage.

In accordance with a first aspect the present disclosure relates to a baggage management system comprising:
  a storage rack for storing baggage;
  the storage rack including a plurality of vertical columns, horizontal rails connected to and extending perpendicular to the vertical columns and a plurality of receptacles formed along the horizontal rails, each receptacle shaped and structured to retain one or more baggage items;
  a baggage transportation system comprising:
  a plurality of automated guided vehicles (AGVs), the automated guided vehicles (AGVs) being configured to transport one or more package items between a pick up point, a drop off point and the storage rack;
  each AGV comprising controller and a wireless communication unit configured for wireless communication and wherein the controller of each AGV configured to control movement of the specific AGV based on received control instructions;
  an baggage administration server comprising: a processor, a memory unit and a wireless communication interface, the baggage administration server configured to:
  receive a request to store or retrieve a baggage item from the storage rack, determine the position of the one or more AGVs,
  identify the one or more AGVs required to either store or retrieve a baggage item as defined in the request
  transmit the control instructions to the one or more AGVs, wherein the control instructions defining movement instructions for the AGVs, wherein the movement instructions defining actions of the one or more AGVs to store or retrieve a baggage item as specified in the request; and
  the controller of the one or more AGVs receiving the control instructions, executing the control instructions and causing the one or more AGVs to store or retrieve the baggage item as defined in the request.

In one configuration the one or more AGVs comprise:
  a elevator coupled to the storage rack and configured to move vertically relative to the rack;
  a carrier coupled to the storage rack and configured to move horizontally relative to the rack;
  a transport vehicle configured to travel between a pick up and/or drop off point and the storage rack.

In one configuration the transport vehicle is freely moveable, and the transport vehicle is configured to carry one or more baggage items and transport the one or more baggage items between the pick up and/or drop off point and the storage rack.

In one configuration the elevator is coupled to the storage rack, the elevator further configured to receive one or more baggage items from the transport vehicle or from the carrier, and the elevator is further configured to travel vertically along the storage rack parallel to a vertical column of the storage rack to transport the one or more baggage items vertically along the storage rack.

In one configuration the carrier is coupled to the storage rack, the carrier further configured to receive the one or more baggage items from the elevator, and the carrier further configured to travel horizontally along the storage rack parallel to a horizontal rail and transport the one or more baggage items horizontally along the storage rack.

In one configuration the carrier is configured to unload the one or more baggage items into a specified storage receptacle.

In one configuration the transport vehicle comprises:
  a chassis,
  a pair of wheels,
  a motor coupled to the wheels, the motor configured to drive the wheels,
  a vehicle controller in electronic communication with the motor,
  a platform attached to the chassis, the chassis supporting the platform.

In one configuration the transport vehicle comprises a lock on the platform, the transport vehicle capable of receiving a carrier box on the platform, and in use, the lock configured to lock the carrier box to the platform and unlock the carrier box from the platform such that the carrier box is moveable relative to the platform.

In one configuration the carrier box configured to receive one or more baggage items within the carrier box.

In one configuration the carrier box comprises a length of between 700 mm to 900 mm, a width of between 300 mm to 700 mm and a height of between 250 mm to 350 mm.

In one configuration transport vehicle comprises a plurality of rollers disposed on or embedded within the platform, the rollers coupled to a roller actuator, the roller actuator configured to actuate the rollers and cause the rollers to roll, the roller actuator is in electronic communication with the vehicle controller, in use the vehicle controller is configured to activate the roller actuator to cause the rollers to roll and wherein the rollers rolling cause the carrier box to move relative to the platform.

In one configuration the transport vehicle further comprises one or more proximity sensors and one or more location sensors, the proximity sensors and the location sensors are in electronic communication with the vehicle controller.

In one configuration the vehicle controller is configured to determine a location of the vehicle based on the one or more location sensor and/or based on the one or more proximity sensors, and the vehicle controller configured to activate the roller actuator to cause the rollers to roll when the vehicle is determined to be adjacent the elevator to transfer the carrier box from the platform to the elevator; and the vehicle controller configured to wirelessly receive control instructions from the baggage administration server, the vehicle controller configured to control the motor based on executing the control instructions to cause the vehicle to move as defined in the control instructions.

In one configuration the elevator comprises:
a slab;
an elevator actuator;
a lift mechanism, the lift mechanism mechanically coupled to the elevator actuator and coupled to the slab; the lifting mechanism connected to a vertical column of the support rack;
the elevator actuator configured to actuate the lift mechanism to cause the elevator to move vertically relative to the vertical column of the support rack;
a plurality of active rollers disposed on or within the slab and the active rollers being selectively actuated, and;
an elevator controller in electronic communication with the elevator actuator and in wireless communication with the baggage administration server, wherein the elevator controller is configured to receive control instructions from the baggage administration server and execute the control instructions to cause the elevator to move vertically along the storage rack to a specified position.

In one configuration the carrier comprises:
a shelf,
a first sliding support connected to a first side of the shelf, a second sliding support connected to a second side of the shelf, the first and second sides are opposing sides of the shelf,
each sliding support is engaged to a horizontal rail of the support rack,
a carrier actuator, the carrier actuator mechanically connected to the first sliding support and the second sliding support, wherein the carrier actuator is configured to actuate the sliding supports to cause the carrier to move horizontally relative to the support rack; and a carrier controller in electronic communication with the carrier actuator and in wireless communication with the baggage administration server, the carrier controller configured to receive control instructions from the baggage administration server, the carrier controller configured to execute the control instructions to cause the carrier to move horizontally to a specified position along the storage rack.

In one configuration shelf comprises a plurality of active rollers and a plurality of ball bearings disposed on or embedded within the shelf, the active rollers being selectively actuated to cause a baggage item to be moved off the shelf.

In one configuration the support rack comprises one or more electrical chargers located at an end of each horizontal rail of the support rack and one or more electrical chargers located at an end of each vertical column, the one or more electrical chargers on the horizontal rail configured to charge the carrier actuator and the one or more electrical chargers on the vertical column configured to charge the elevator actuator.

In one configuration the baggage administration server comprises:
a baggage movement coordinator comprising a computer program saved on a memory unit of the baggage administration server and the program being executed by the processor, the baggage movement coordinator is configured to:
determine the position of the AGVs,
determine a path the AGVs are required to follow to either store or retrieve a baggage item as defined in the request,
generate control instructions to be transmitted to the AGVs to cause the AGVs to move along the determined path to store or retrieve the baggage item as defined in the request, the control instructions being transmitted to the AGV controllers by the wireless communication interface of the baggage administration server.

In one configuration the baggage management system comprises:
a kiosk comprising a user interface, a wireless communication unit, a kiosk processor and a memory unit,
the kiosk configured to:
receive, via the user interface, a request to store or retrieve a baggage item,
process the request and determine if the user is an authorized user,
if the user is an authorized user the presenting acceptance of the request on the user interface
if the user if unauthorized presenting an error on the user interface.

In one configuration the kiosk comprises a camera and a printer, the camera configured to capture an image of the baggage item and the printer configured to print a receipt or docket in response to a user being recognized as an authorized In one configuration the baggage administration server further comprising:
a baggage tracking engine, the baggage tracking engine being stored in the memory unit of the baggage administration server and executed by the processor of the baggage administration server,
wherein the baggage tracking engine comprising instructions executable by the processor of the baggage administration server to cause the baggage administration server to execute the steps of:
receiving a request to store or retrieve a baggage item,
check if the user is an authorized user by checking an authorized user database,
locating the baggage item from a baggage database of stored baggage items,
identifying the storage receptacle the baggage item is located at or identifying an unused storage receptacle in the storage rack,
providing storage receptacle identity to the baggage movement coordinator to generate control instructions.

According to a second aspect the present disclosure relates to a method for baggage management, the method steps being executed by a baggage administration server, the method comprising the steps of:
receiving a request, from a kiosk or mobile device, to store or retrieve a baggage item, determining the location of the baggage item and/or determining a free storage receptacle within the storage rack,
determining the position of one or more automated guided vehicles relative to the storage rack, wherein the automated guided vehicles are used to store or retrieve a baggage item, identifying the AGVs that are to be recruited to store or retrieve the baggage item defined in the request, calculating a path the identified AGVs are required to follow to either store or retrieve a baggage item as defined in the request, providing control instructions to a controller of each of the identified AGVs to cause the AGVs to store or retrieve a bag as defined in the request.

In one configuration the method further comprises the additional steps of:

authenticating a user as an authorised user, storing the authenticated user identity in a user database, receiving identity of one or more baggage items associated with the user, storing the identity of the baggage associated with the user in a baggage database, and updating the user database and baggage database following receipt of a request and authenticating a user.

In one configuration the step of calculating a path comprises determining an optimal path to store or retrieve a baggage item and determining at least one of a position and future position of other AGVs, the position and/or future position of AGVs being used to determine a path that will avoid collisions.

In one configuration the step of calculating a path and transmitting control instructions are performed in real time or at regular time intervals.

According to a third aspect the present disclosure relates to a method of baggage management, the method being executed by a baggage management system, the baggage management system comprising a baggage administration server, a storage rack, a plurality of automated guided vehicles (AGVs) and a kiosk for user interaction, the method comprising the steps of:

receiving a request for storing or retrieving a baggage item at kiosk;

the kiosk in wireless communication with the baggage administration server via a wireless communication network;

receiving the request for storing or retrieving a baggage item at the baggage administration server;

sending, by the server, an authentication request to the kiosk;

the kiosk presenting an authentication request to the user;

receiving and transmitting a user identifier to the baggage server by the kiosk;

the baggage server configured to check the user identifier with a user database storing authenticated users and associated user identifiers;

the baggage server configured to authenticate the user;

determining, by the baggage administration server, a location of the baggage item if the request is a retrieval request or determining the location of a free receptacle in the storage rack;

determining, by the baggage administration server, a position of one or more transport vehicles;

determining, by the baggage administration server, a position of an elevator relative to the storage rack;

determining, by the baggage administration server, a position of a carrier relative to the storage rack;

identifying, by the baggage administration server, the transport vehicle required to complete the request;

calculating a path of the identified transport vehicle, elevator and carrier to complete the request, by the baggage administration server, wherein the path comprises the most efficient path of movement for the transport vehicle, carrier and elevator to avoid collisions and complete the request;

generating control instructions, by the baggage administration server, defining movement instructions for the transport vehicle, elevator and carrier;

transmitting control instructions, by the baggage administration server, to a controller of the transport vehicle, controller of the elevator, and a controller of the carrier;

the transport vehicle controller, the elevator controller and carrier controller executing the control instructions received from the baggage administration server, and the transport vehicle, elevator and carrier moving as defined in the control instructions to complete the request.

The term "comprising" (and its grammatical variations) as used herein are used in the inclusive sense of "having" or "including" and not in the sense of "consisting only of".

Baggage as used herein means bags, luggage, parcels or other items that a customer would want to store and later retrieve.

BRIEF DESCRIPTION OF THE DRAWINGS

Embodiments of the system and method for authenticating a product will now be described, by way of example, with reference to the accompanying drawings in which:

FIG. 4 illustrates an embodiment of an elevator of the baggage management system and a transport vehicle adjacent the elevator.

FIG. 5 illustrates an embodiment of a carrier of the baggage management system.

FIG. 6a illustrates a schematic of the baggage administration server of the baggage management system.

FIG. 10a illustrates a method of storing a baggage item using a baggage management system.

FIG. 10b illustrates a method of storing a baggage item using a baggage management system.

FIG. 10c illustrates a method of storing a baggage item using a baggage management system.

FIG. 10d illustrates a method of storing a baggage item using a baggage management system.

FIG. 10e illustrates a method of storing a baggage item using a baggage management system.

FIG. 10f illustrates a method of storing a baggage item using a baggage management system.

FIG. 10g illustrates a method of storing a baggage item using a baggage management system.

FIG. 10h illustrates a method of storing a baggage item using a baggage management system.

FIG. 10i illustrates a method of storing a baggage item using a baggage management system.

FIG. 10j illustrates a method of storing a baggage item using a baggage management system.

FIGS. 11a and 11b illustrate an alternative embodiment of a carrier box of the baggage management system.

DETAILED DESCRIPTION OF THE PREFERRED EMBODIMENTS

The present disclosure relates to a baggage management system and a method for baggage management. In particular, the present disclosure relates to an automated baggage management system and an automated method of baggage management to facilitate automatic baggage storage and/or retrieval. The automated baggage management system can be used in a variety of operations and situations where baggage is required to be stored. For example, the automated baggage system can be used in hotels or airports. The automated baggage system disclosed herein allows users to self manage baggage storage and retrieval.

The baggage management system comprises a storage rack for storing baggage. The storage rack including a plurality of vertical columns, horizontal rails connected to and extending perpendicular to the vertical columns and a plurality of receptacles formed along the horizontal rails. Each receptacle is shaped and structured to retain one or more baggage items. The system further comprises a baggage transportation system. The baggage transportation system comprises a plurality of automated guided vehicles (AGVs). The automated guided vehicles (AGVs) are configured to transport one or more package items between a pick up point, a drop off point and the storage rack. Each AGV comprises a controller and a wireless communication unit configured for wireless communication. The controller of each AGV configured to control movement of the specific AGV based on received control instructions.

The baggage management system comprises an baggage administration server. The baggage administration server comprises: a processor, a memory unit and a wireless communication interface. The baggage administration server is configured to: receive a request to store or retrieve a baggage item from the storage rack, determine the position of the one or more AGVs, identify the one or more AGVs required to either store or retrieve a baggage item as defined in the request and transmit the control instructions to the one or more AGVs. wherein the control instructions defining movement instructions for the AGVs, wherein the movement instructions defining actions of the one or more AGVs to store or retrieve a baggage item as specified in the request.

The controller of the one or more AGVs receiving the control instructions, executing the control instructions and causing the one or more AGVs to store or retrieve the baggage item as defined in the request.

Figure 1:
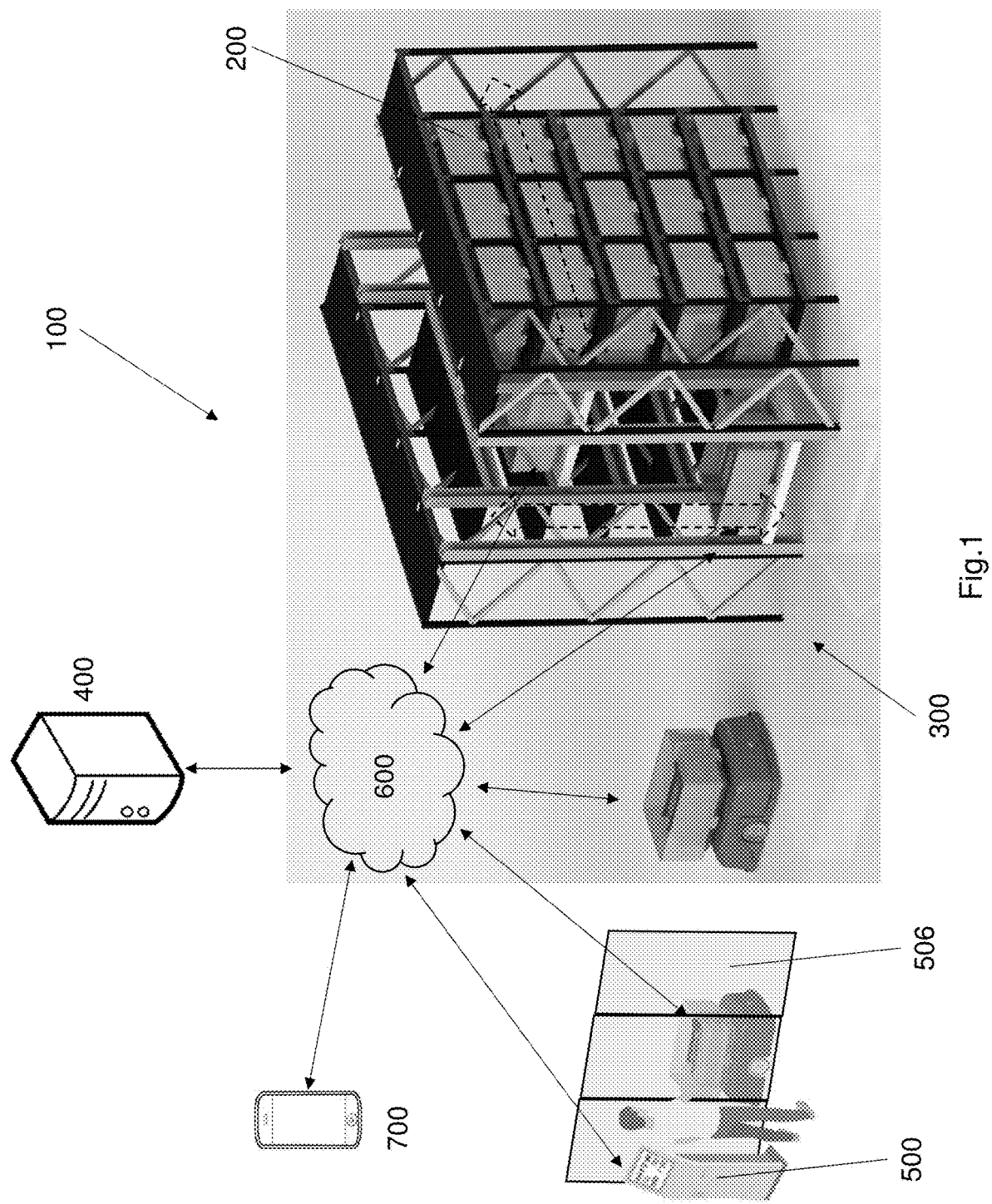
FIG. 1 illustrates an embodiment of a baggage management system.

FIG. 1 shows an example embodiment of a baggage management system 100. The baggage management system 100 is an automated baggage management system that facilitates automated storage and/or retrieval of one or more baggage items. Referring to FIG. 1, the baggage management system 100 comprises a storage rack 200, a baggage transportation system 300 and a baggage administration server 400. The baggage management system 100 may comprise an optional kiosk 500, as shown in FIG. 1.

The storage rack 200 comprises a plurality of receptacles to store baggage items. The baggage transportation system 300 comprises a plurality of automated guided vehicles (AGVs). The AGVs 310, 320, 330 are automated vehicles that move along a specified path to facilitate storing or retrieval of baggage items. The AGVs (i.e. robotic vehicles) are automatically controlled vehicles. The AGVs each comprise various hardware and a controller and a wireless communication unit to allow communication with the baggage administration server 400.

The baggage administration server 400 is a computing device that comprises a processor, a memory unit, a wireless communication interface and appropriate software i.e. computer programs that define instructions. The baggage administration server 400 is configured to handle requests for storage or retrieval of baggage items, authenticate a user, determine which AGVs are required to perform a request, determine the paths of the AGVs and coordinate actions of the AGVs by communicating wirelessly with the AGVs. The baggage administration server 400 is configured to transmit control instructions to the controllers of specific AGVs. The controllers of the AGVs execute the control instructions and follow the specified path in the control instructions. The movement of the AGVs is coordinated by the baggage administration server 400.

The optional kiosk 500 functions as a user interaction station. A user can input a request for storing or retrieval of a baggage item 10. The kiosk may comprise a camera, a printer and a door 506. The kiosk 500 can act as a pick up and drop off point. The user can also perform an authentication process via the kiosk 500. Alternatively, the user may comprise an application executed on a user's mobile phone to access the baggage administration server 400.

The baggage administration server 400 is configured to wirelessly communicate with the kiosk 500, user's mobile device 700 and AGVs via a suitable network 600. The network 600 can be any suitable wireless communication network 600 e.g. a cellular network or a WPAN or a WLAN or a combination thereof. The baggage administration server 400 preferably functions as a server. The baggage administration server 400 comprises several software programs or software applications. The software programs or applications define method steps and when executed cause the baggage administration server 400 to execute several steps.

In use, a user interacts with the kiosk 500 or an application on the user mobile device 700 (e.g. a smartphone). The user inputs a request for storing or retrieving a baggage item or items. The request is received by the baggage administration server 400. The baggage administration server 400 processes the request. The baggage administration server 400 is configured to check if a user is an authorized i.e. authenticated user. The baggage administration server 400 is further configured to locate the baggage item from a database of stored baggage items, identify the storage receptacle the baggage item is located in or identifying one or more unused storage receptacles in the storage rack. The baggage administration server 400 is configured to generate control instructions to control the AGVs to store the baggage item in the identified storage receptacle or retrieve the baggage item from the identified storage receptacle.

Figure 2:
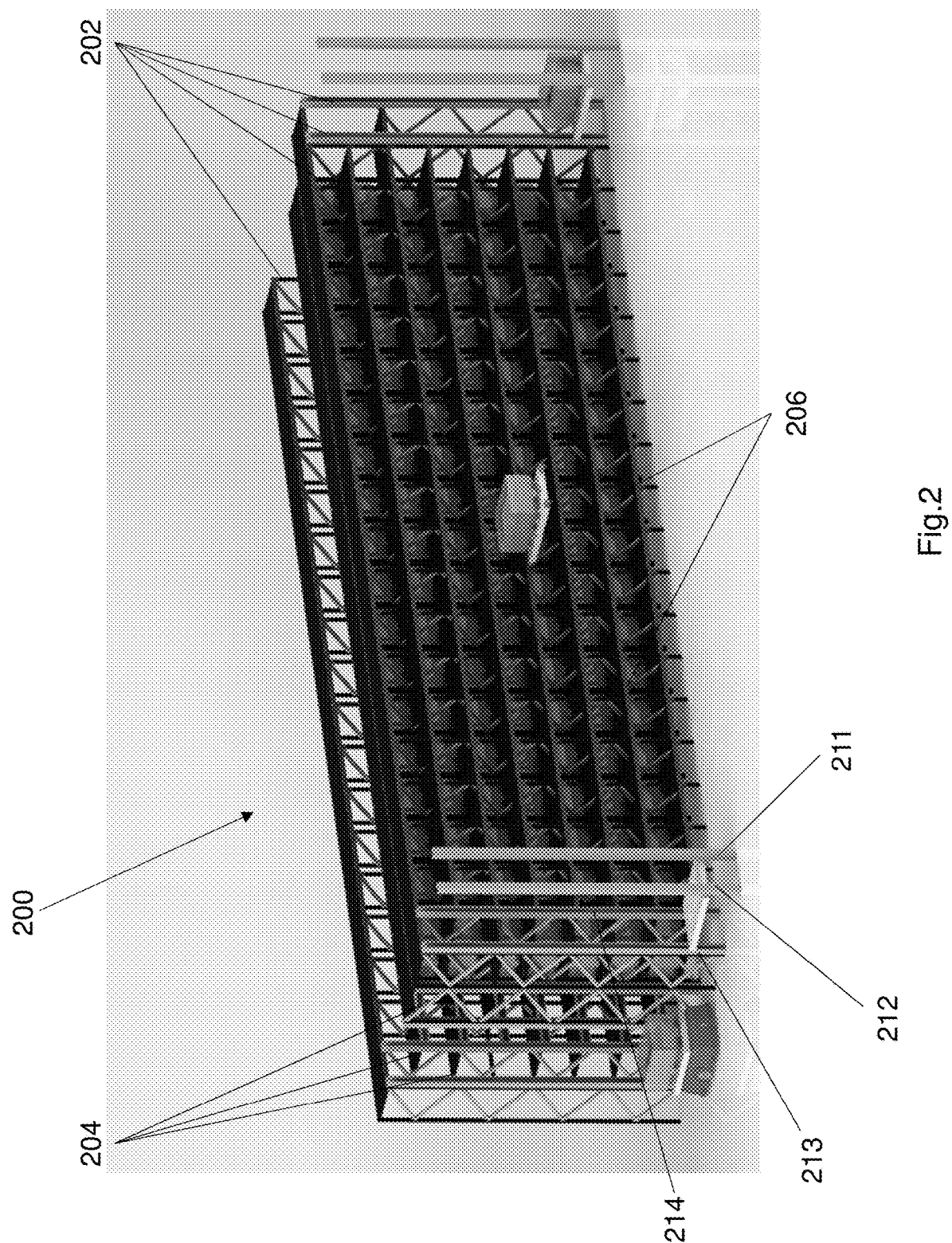
FIG. 2 illustrates a view of view of a storage rack of the baggage system and associated elevators and carriers.

Details of the baggage system 100 will now be described in more detail. FIG. 2 illustrates an example form of the storage rack 200. The storage rack 200 shown in FIG. 2 is an expanded rack of FIG. 1. The storage rack 200 comprises a plurality of vertical columns 202, a plurality of horizontal rails 204 connected to the vertical columns and a plurality of receptacles 206 formed along the horizontal rails. Each receptacle is shaped and structured to retain one or more baggage items. The receptacles 206 each include a ledge or shelf that supports a baggage item. The rack may comprise diagonal struts extending across each receptacle to provide additional stiffness and stability to the rack 200.

The storage rack comprises at least four elevator columns 211, 212, 213, 214. The four elevator columns 211-214 are configured to allow an elevator to move along the columns to transport baggage items vertical along the rack 200. The elevator columns may be located at one end of the rack 200 as shown in FIG. 2. Alternatively, they may be located in the centre of the rack or may be located at multiple locations within the rack. The horizontal rails support horizontal carriers that can travel along the rails.

The columns 202 and rails 204 are formed of metal or wood or any other suitable material. The shelf of each receptacle may also be formed of metal or wood or plastic or any other suitable material. The rack 200 shown in FIG. 2 is a larger example of the rack shown in FIG. 1. The rack 200 can be any suitable dimension depending on the number of baggage items that are required to be stored.

The rack 200 of FIG. 1 comprises five rows, three columns and two sides of receptacles i.e. two collections of receptacles on each side as shown in FIG. 1. The rack 200 of FIG. 1 provides a total of thirty storage units. Dimensions of the rack in FIG. 1 may be 3.2 m length, 2.6 m width and 2.7 m height. The example rack 200 shown in FIG. 2 is a larger rack and comprises a plurality of the racks of FIG. 1 joined together to create a large rack. The rack of FIG. 2 can have dimensions of 12.2 m length, 5.3 m width and 3.7 m height. The larger rack 200 of FIG. 2 comprises seven rows, eighteen columns and four sides of receptacles, providing 504 storage units. The rack 200 of FIG. 2 may comprise a floor loading of less than 0.9 ton per square metre.

Each receptacle of the rack 200 may be rectangular or may be square shaped. In one example each receptacle may have a dimension of 590 mm width and 440 mm height, with the depth being any suitable value subject to the size requirements. The size of the rack can be defined based on the needs of the number of baggage items to store. The columns 202 and rails 204 may comprise a major dimension of 50 mm in one example. In this example they both may comprise a square cross section with a width of 50 mm. The shape of the rails and columns can be any suitable shape. The elevator columns 211-214 may be larger in cross sectional dimensions than the other columns.

The baggage management system 100 may comprise one rack. Alternatively, the system 100 may comprise multiple racks positioned adjacent each other as shown in FIG. 2. The number of racks positioned adjacent each other can be selected based on the amount of storage required.

The baggage transportation system 300 comprises a plurality of AGVs that can automatically move around to facilitate storing and/or retrieving baggage items from the rack 200. The baggage transportation system 300 comprises one or more transport vehicles 310, one or more elevators 320 and one or more carriers 330.

Figure 3:
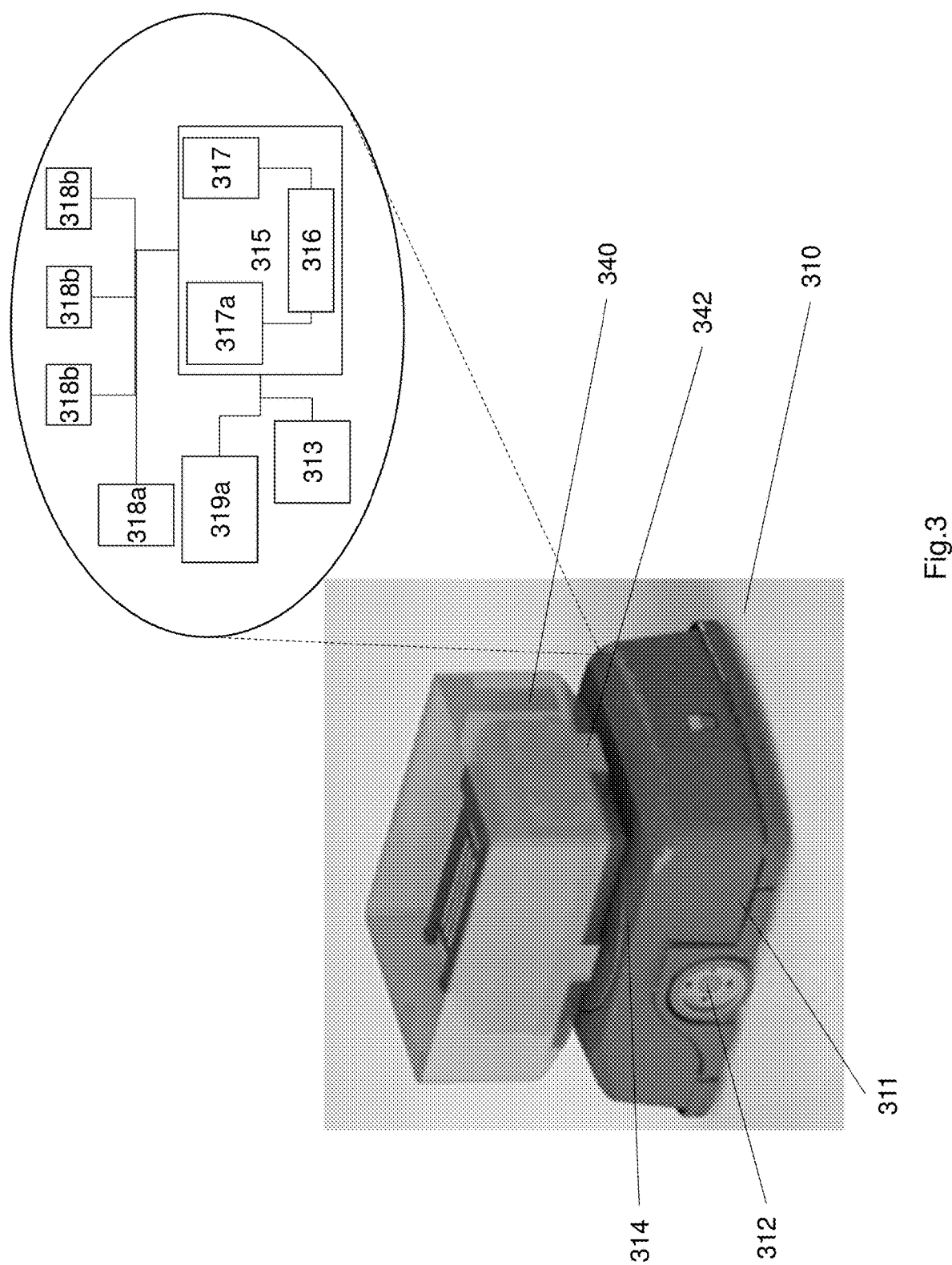
FIG. 3 illustrates an embodiment of a transport vehicle used as part of the baggage management system.

FIG. 3 shows an example of a transport vehicle 310. The transport vehicle 310 is an automated robot that is controlled by the baggage administration 400. The transport vehicle comprises a chassis 311, a pair of wheels 312, a motor 313 coupled to the wheels, a platform 314 attached to the chassis and supported by the chassis 311 and a controller 315. The motor 313 drives the wheels directly or through a coupling or a drive train. The chassis 311 is a rigid chassis. The wheels 312 are mounted to an axle (not shown) that is coupled to the motor 313. The controller 315 comprises a processor 316, a wireless communication unit 317 and a memory unit 317a. The controller 315 is configured to communicate with the baggage administration server 400 via the wireless communication unit 317. The wireless communication unit 317 can receive and transmit messages from the baggage administration server 400. In one example the wireless communication unit may be a wireless communication transceiver. The wireless communication transceiver 317 may be configured to communicate using any suitable wireless communication protocol e.g. BlueTooth, ZigBee or any other suitable format.

The transport vehicle further comprises one or more sensors. Preferably the transport vehicle comprises at least one location sensor 318a and one or more proximity sensors 318b. The location sensor 318a may be a location transceiver or any other suitable location sensor. For example, the location sensor 318a may connect to a GPS system or a local positioning system. The proximity sensors 318b may be mechanical sensors or be optical sensors or acoustic sensors. For example, the proximity sensors may be limit switches or laser sensors or ultrasound sensors. The controller 315 is in electronic communication with the at least one location sensor 318a and the one or more proximity sensors 318b. The controller is configured to process the outputs from the sensors. The controller is configured to determine location information from the at least one location sensor 318. The controller 315 is further configured to determine if the transport vehicle 310 is within proximity of another object. The controller 315 may be configured to detect proximity and stop the transport vehicle movement to avoid collisions. The controller 315 comprises appropriate interfacing circuitry (not shown) e.g. digital to analog converts, filters etc. that allows electronic communication between the controller 315 and the sensors 318a, 318b. The controller further comprises the appropriate connection electronics and firmware and or software stored in memory to define the function of the controller.

Alternatively, the baggage administration server 400 may be configured to receive proximity data from the controller 315. The controller 315 may pre-process the sensor data and transmit the pre-processed data. The pre-processing may comprise filtering data and reducing noise or amplifying the signal and encoding the signals appropriately. The baggage administration server 400 may be configured to process proximity data received from the controller 315. The baggage administration server 400 or a software program within the server 400 may determine if the vehicle 310 is too close to another object and transmit a signal to stop the vehicle 310.

The controller 315 is configured to pre-process the location information from the location sensor 318. The controller 315 is configured to transmit the location information to the server 400. The server 400 is configured to receive and process the location information to determine the location of the vehicle 310 within an area. The location of the vehicle 310 can be tracked by the server 400. The server 400 is further configured to coordinate the movement of multiple vehicles within an area. Additional details will be described later.

The transport vehicle further comprises one or more rollers 319 positioned on the platform 314. Alternatively, the rollers may be embedded into the platform 314. As shown in FIG. 4, the transport vehicle 310 comprises a plurality of active rollers 319 embedded within the platform. A portion of the rollers extends upward through the platform 314. The rollers 314 are active rollers and comprise an actuator that is activates the rollers 319 to roll. The roller actuator 319a is controlled by the controller 315. The roller actuator is actuated to cause the rollers to roll. The rollers can be activated to cause objects on top of the platform to move along the platform.

The transport vehicle comprises a lock 314a on the platform 314. The platform 314 may comprise a plurality of locks. The lock 314a engages a carrier box 340 that is placed on the platform 314. The transport vehicle 310 is capable of receiving a carrier box 340 on the platform 314. In use, the lock 314a is configured to lock the carrier box 340 to the platform and unlock the carrier box from the platform such that the carrier box is moveable relative to the platform 314. The carrier box 340 retains at least one baggage item. The carrier box is received onto the platform 314 and locked to the platform during the vehicle moving around the space. The lock 314a may comprise four moveable arms that engage corresponding locking apertures formed in the carrier box.

The baggage management system 100 comprises a plurality of carrier boxes 340. The carrier boxes 340 define a container to hold one or more baggage items. Each carrier box 340 may be rectangular shaped. Each carrier box 340 is formed of a rigid material to ensure the carrier box is robust. The carrier box 340 may comprise dimensions of between 700 mm to 900 mm length, 300 to 700 mm width and a height of between 250 mm to 350 mm. In one example, the carrier box has dimensions that are smaller than the receptacles 206 of the rack to ensure the carrier box fits into the receptacle 206. In one example, the carrier box comprises dimensions of 820 mm length, 570 mm width and 370 mm height. Other dimensions are also contemplated. The carrier box preferably comprises a plurality of locking apertures 342 formed in the carrier box 340. In one example the carrier box 340 comprises four locking apertures 342. One locking aperture formed in each face of the carrier box 340. The locking apertures receive the locking arms of the locking mechanism 314a to lock the carrier box 340 to the platform 314. FIG. 10d illustrates the locking arms 314a of the lock engaged into locking apertures 342 of the carrier box 340.

FIG. 4 shows an example embodiment an elevator 320. The elevator 320 is coupled to the rack 200. The elevator 320 is coupled to a vertical column of the rack 200. Preferably the elevator 320 is connected to the elevator columns 211-214, as shown in FIG. 2. The elevator 320 comprises a slab 321, an elevator actuator 322 and a lift mechanism 322a. The lift mechanism is mechanically coupled to the elevator actuator 322 and the slab 321. The lift mechanism may be a linear gear that comprises a vertical geared member 322b and a toothed wheel 322c that can move along the geared member, as shown in FIG. 5. The geared member comprises teeth that engage the teeth of the geared wheel. The elevator actuator 322 may comprise a motor that is coupled to the wheel to drive rotation of the wheel. The motor may be a stepper motor or may be a linear motor. The lifting mechanism is configured to allow precise movement of the elevator due to the geared nature.

The elevator actuator 322 is configured to actuate the lift mechanism to lift the slab vertically relative to the rack 200. The lift mechanism i.e. the vertical gear extends along vertical columns 202 of the rack 200. More preferably each of the elevator columns 211-214 have the linear gear attached to them and extending vertically along the column.

The elevator 320 further comprises a plurality of active rollers 323 disposed on or within the slab 321. The elevator comprises a roller actuator 324 that is coupled to the active rollers 323. The roller actuator 324 is configured to selectively actuate the rollers. The rollers 323 are actuated to move baggage items off the slab 321. The elevator 320 further comprises an elevator controller 325. The elevator controller 325 comprises a processor 326a and a wireless communication unit 326b. The wireless communication unit allows the elevator controller 325 to wirelessly communicate with the baggage administration server 400. The elevator controller is in electronic communication with the roller actuator 324 and the elevator actuator 322. The elevator controller 325 controls the operation of the roller actuator 324 and the elevator actuator 322.

The elevator may comprise one or more position sensors (not shown). The position sensors are configured to track the position of the elevator along the vertical columns relative to the rack 200. The position sensors may be optical sensors, acoustic sensors or a hall sensor or another suitable sensor or transducer. The position sensor 327 may be connected to the slab to determine the vertical positon of the slab 321, as shown in FIG. 5. Alternatively, the position sensor/sensors may be coupled to the elevator actuator 322 and these sensors may determine the position based on the rotation of the motor 322. As a further alternative, the rack 200 may comprise a plurality of position sensors, wherein a position sensor is located at each level in the rack. The position sensor is in electronic communication with the elevator controller 325. The elevator controller 325 is configured to determine the vertical position of the elevator e.g. the level the elevator is at. Optionally vertical position of the elevator 320 may be transmitted to the server 400.

The elevator 320 is moved vertically based on received control instructions from the server 400. The server 400 provides control instructions to the elevator controller 325. The elevator controller 325 is configured to control the elevator actuator 322 to move the elevator vertically to the specified position in the control instructions.

FIG. 5 illustrates an example form of a carrier 330. The baggage system 100 comprises a plurality of carriers 300. Each horizontal rail of the rack 200 includes a carrier 330 coupled to the rack i.e. each level of the rack 200 comprises a carrier 330. The carrier 330 comprises a shelf 331, a first sliding support 332 connected to a first side of the shelf and a second sliding support 333 connected to the second side of the shelf 331. The first and second sides are opposing sides of the shelf. Each sliding support 332, 333 is engaged to a horizontal rail 204. Each sliding support may comprise a pair of wheels. The wheels may be coupled by a chain or a belt.

The carrier comprises a carrier actuator 334. The carrier actuator 334 is mechanically connected to the first sliding support 332 and the second sliding support 333. The carrier actuator is configured to actuate the sliding supports 332, 333. The carrier actuator 334 may comprise a motor e.g. a linear motor. The motor may be coupled to the sliding supports 332, 333 by a drive assembly comprising a lever or chain or belt or drive shaft or any other suitable mechanism or assembly of parts. The sliding supports 332, 333 are configured to cause the shelf 331 to slide horizontally relative to the rails of the rack 200.

The carrier 330 comprises a position sensor 335. The position sensor 335 may be mounted onto the shelf 331. The position sensor 335 is configured to measure the horizontal position of the carrier 330 relative to the rack. The carrier 330 comprises a carrier controller 336. The carrier controller 336 comprises a processor 336a and a wireless communication unit 336b. The controller 336 is an integrated chip or may be a microprocessor. The controller 336 is in electronic communication with the carrier actuator 334. The carrier controller configured to receive control instructions from the baggage administration server, the carrier controller configured to execute the control instructions to cause the carrier to move horizontally to a specified position along the storage rack.

The carrier 330 further comprises a plurality of active rollers 337 and a plurality of ball bearings 338 disposed on the shelf 331. The carrier 330 also comprises a roller actuator 339. The roller actuator is in electronic communication with the carrier controller 336. The carrier controller 336 is also configured to actuate the rollers in order cause the baggage item on the shelf 331. The ball bearings 338 and rollers 337 are embedded in the shelf 331.

Figure 7B:
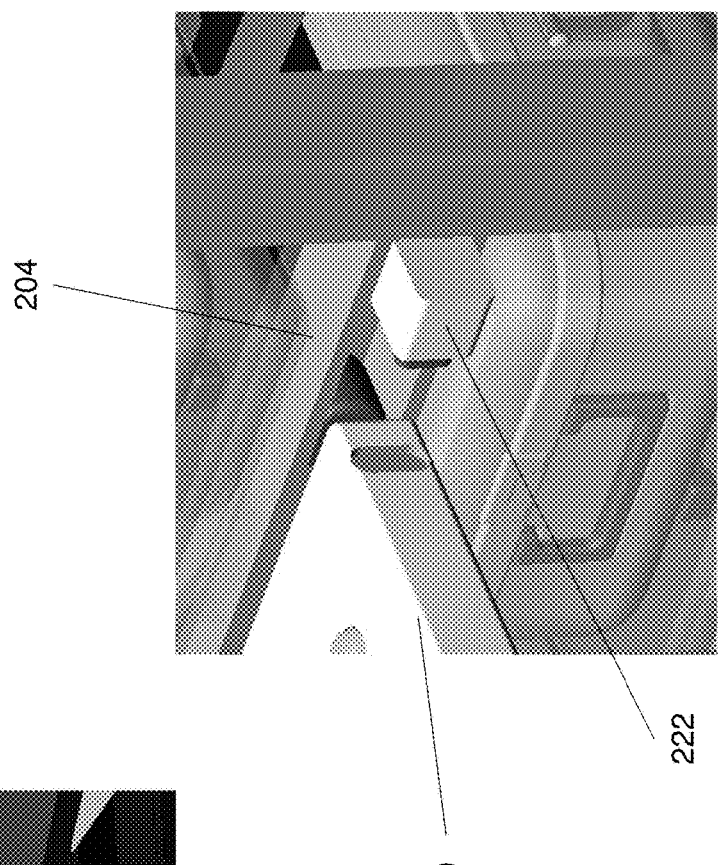
FIG. 7b illustrates a charger disposed on a horizontal rail of the storage rack used to charge the elevator.
Figure 7A:
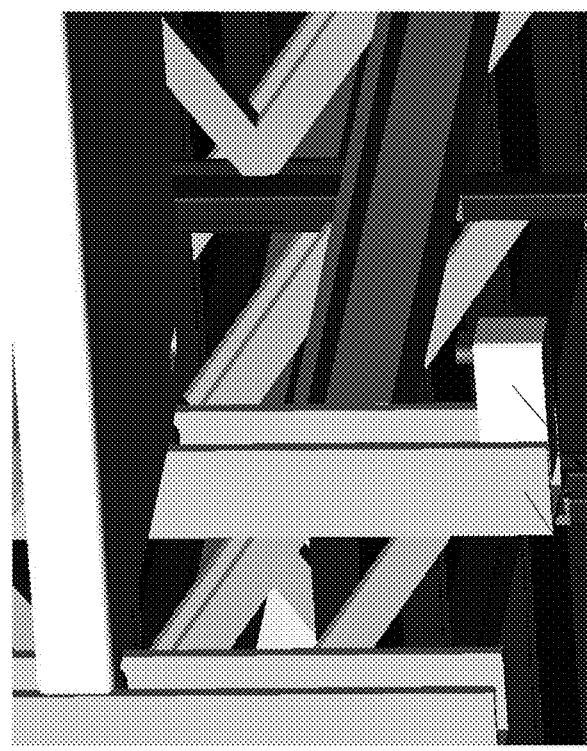
FIG. 7a illustrates a charger disposed on a vertical column of the storage rack used to charge an elevator.

The rack 200 further comprises a plurality of electronic chargers. FIGS. 7a and 7b illustrate electrical chargers 220, 222. At least one or more electrical chargers are located at an end of each horizontal rail of the support rack and one or more electrical chargers are located at an end of each vertical column. As shown in FIG. 7a there is an electrical charger 220 positioned at the base of the vertical column, in particular at the base of an elevator column 211. The electrical charger 220 is configured to connect to the elevator actuator 322 and charge the elevator actuator 322. Preferably the elevator actuator 322 comprises a battery that is charged by the charger 220. The battery is configured to power the elevator actuator 322. As shown in FIG. 7b there is an electrical charger 222 positioned at the end of each horizontal rail. The charger 222 is configured to connect to the carrier actuator 334 and charge the carrier actuator 334. The carrier actuator 334 preferably comprises a battery that is charged by the electrical charger 222.

FIG. 6a shows a schematic of the baggage administration server 400. comprises at least a processor and an associated memory unit or a plurality of memory banks. The baggage administration server 400 comprises suitable components necessary to receive, store and execute appropriate computer instructions. The components may include a processing unit 402 (i.e. a processor), read-only memory (ROM) 404, random access memory (RAM) 406, and input/output devices such as disk drives 408, input devices 410 such as an Ethernet port, a USB port, etc. The server 400 further comprises a wireless communication interface 414 i.e. a communication chip or communication IC that is configured to facilitate wireless communications via a communication network. The wireless communication interface 414 allows the baggage administration server 400 to wirelessly link to a plurality of communication networks. The wireless communication interface 414 may also the server 400 to link with localised networks such as for example Wifi or other LAN (local area networks). The wireless communication interface 414 allows the server 400 to wirelessly communicate with each of the AGVs (310, 320, 330) in the system and receive and transmit information from these. The interface 414 allows the server 400 to communicate with corresponding wireless communication units in the AGVs and transmit information e.g. control instructions that define movement of the AGVs.

The processing unit 402 may comprise one or more electronic processors. The processors may be microprocessors or FPGAs or any IC based processor. In one exemplary construction the processing unit 402 comprises a plurality of linked processors that allow for increased processing speed and also provide redundancy. In some alternative forms, the processing unit 402 may include adequate processors to provide some redundant processing power that can be accessed during periods of high need e.g. when multiple functions are being executed.

The server 400 includes instructions that may be included in ROM 404, RAM 406 or disk drives 408 and may be executed by the processing unit 402. The server 400 may include storage devices such as a disk drive 408 which may encompass solid state drives, hard disk drives, optical drives or magnetic tape drives. The server 400 may use a single disk drive or multiple disk drives. The server 400 may also have a suitable operating system which resides on the disk drive or in the ROM of the server 400. The operating system can use any suitable operating system such as for example Windows or Mac OS or Linux.

The server may include a plurality of instructions as computer programs or software applications. The server 400 comprises a baggage movement coordinator 420, a bag tracking engine 422 and a kiosk interface 424. The baggage movement coordinator 420 and the bag tracking engine 422 are computer programs that are stored on one of the memory unit e.g. in ROM 404 or in a disk drive 408. The baggage movement coordinator 420 and the bag tracking engine 422 define instructions that cause the processor and the server 400 to perform functions defined in the programs.

The server 400 further comprises a baggage database 430 residing on a disk or other storage device which is arranged to store records of stored baggage items within the rack 200. The server 400 further comprises a user database 432 residing on a disk or other storage device which is arranged to store records of authenticated users. The server 400 further comprises a vehicle database 434 that comprises the identities of the AGVs within the system 100. The vehicle database 434 may store a serial number or ID number and may also store a unique communication address (e.g. an IP address or a comms port address) of each AGV. The communication addresses can be used to write control instructions from the server 400 to the controller of the specific AGV.

The server 400 may be coupled to a remote cloud storage system 440 via the communication interface or through another suitable interface. The cloud storage system 440 may be part of and/or accessible through the server 400. The data regarding authenticated users and/or stored and retrieved baggage may be stored on the cloud storage system. The server 400 may further communicate with a customer management system e.g. a hotel customer management system. For example the server 400 may be configured to transmit data related to authenticated users and/or specific baggage that is stored in the rack to the customer management system to link the authenticated users with the customers. A user may have an application on their device e.g. a mobile device or a smartphone. The user device application is configured to communicate with the server 400.

Figure 6B:
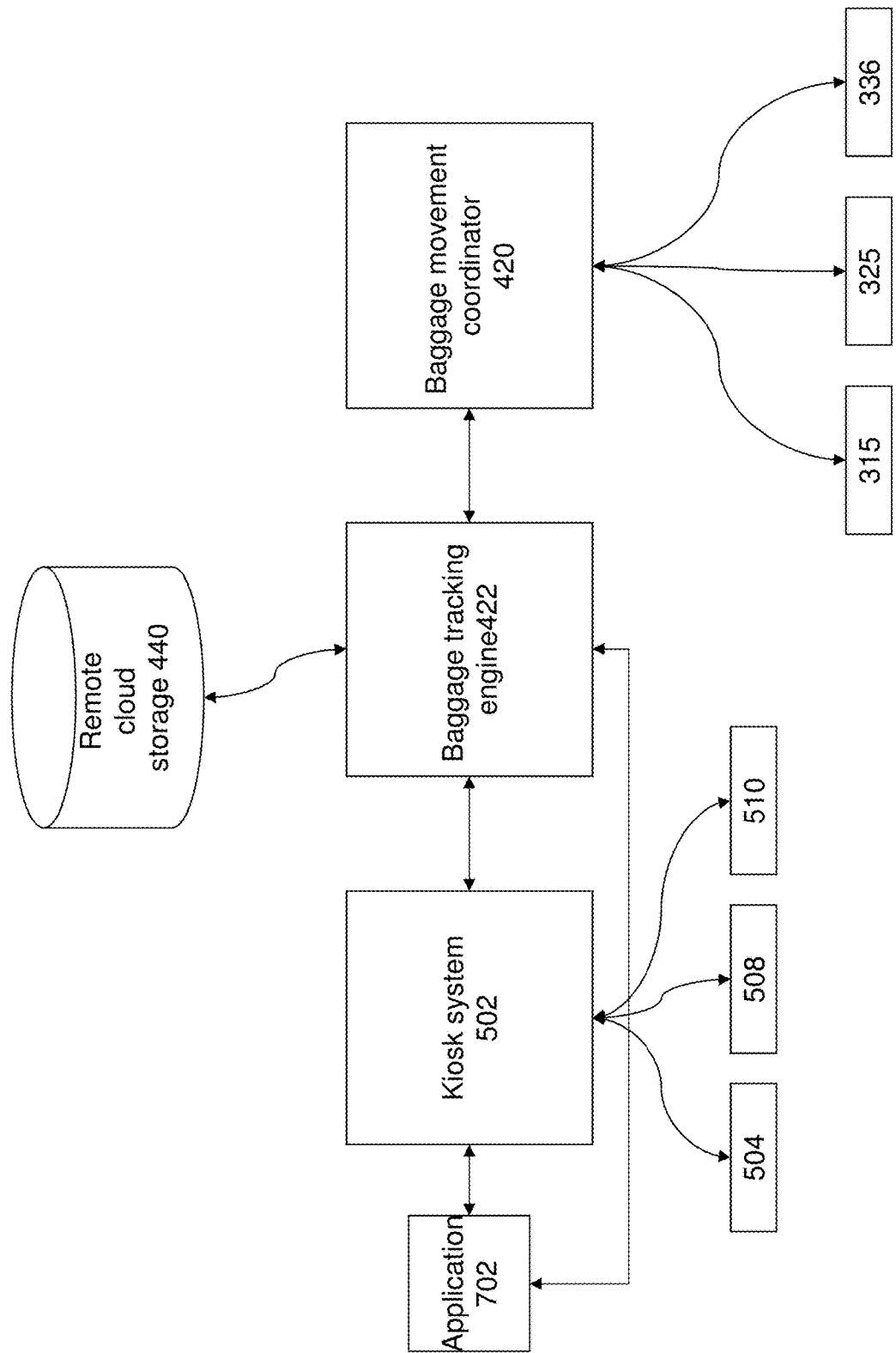
FIG. 6b illustrates a schematic of an example system architecture of the baggage administration server.

FIG. 6b shows an example of the system architecture of the server 400. The system architecture illustrates components of the system and their relationships. Referring to FIG. 6b the bag tracking engine 422 in communication with the baggage coordinator 420 and the kiosk system 502. The bag tracking engine 422 comprises a software program defining instructions. The baggage coordinator 420 is a program that defines instructions to cause the server 400 to generate and transmit control instructions to the controller of each of the transport vehicle 310, elevator 320 and carrier 330. The baggage coordinator communicates with the transport vehicle controller 315, elevator controller 325 and the carrier controller 336.

The bag tracking engine 422 is in communication with the kiosk system 502. The kiosk system 502 system is in communication with components of the kiosk 500. Data can be transferred or accessed between the programs. The baggage tracking engine 422 is in communication with the remote cloud storage 440 system. A user device application is also arranged in communication with the kiosk system 502 or the baggage tracking engine 422. The application can transmit information to and receive information from the baggage tracking engine 422 and/or the kiosk system 502.

The baggage tracking engine 422 defines instructions executable by the processor 402 of the baggage administration server 400 to cause the baggage administration server to execute the steps of: receiving a request to store or retrieve a baggage item, check if the user is an authorized user by checking an authorized user database, locating the baggage item from a database of stored baggage items, identifying the storage receptacle the baggage item is located at or identifying an unused storage receptacle in the storage rack, and providing storage receptacle identity to the baggage movement coordinator to generate control instructions. The baggage tracking engine 422 is further configured to handle self service storage and retrieval by receiving a request, store baggage photos and a baggage identity. The baggage identity is stored in the baggage database 430. The baggage tracking engine 422 comprises instructions that are programmed to cause the server 400 to authenticate a user as an authorised user of the system. The authorised user is stored in the user database 432. The user database 432 may further store an identifier or tag or other information about associated baggage with the user. The engine 422 is configured to cause the server 400 to transmit and store data in the cloud storage system and may also facilitate retrieval of the baggage by an attendant.

The baggage movement coordinator 420 comprises instructions that are configured to cause the server to perform the follow steps. The coordinator 420 is configured to: determine the position of the AGVs, determine a path the AGVs are required to follow to either store or retrieve a baggage item as defined in the request, generate control instructions to be transmitted to the AGVs to cause the AGVs to move along the determined path to store or retrieve the baggage item as defined in the request, and the control instructions being transmitted to the AGV controllers by the wireless communication interface of the baggage administration server.

As shown in FIG. 6b the kiosk may comprise a camera 504, a door lock 508 associated with the door 506 and a printer 510. The kiosk system 502 is configured to communicate with and control the operation of the camera 504, door lock 508 and the printer 510. The kiosk system 502 is configured to receive, via the user interface, a request to store or retrieve a baggage item. The kiosk system 502 is further configured to process the request and determine if the user is an authorized user. If the user is an authorized user the presenting acceptance of the request on the user interface and if the user if unauthorized presenting an error on the user interface. The camera 504 can be configured to capture an image of the user and/or baggage item and transmit this image to the baggage tracking engine for storage in a memory unit or in database 434. The door lock can be unlocked by the kiosk system 502 when prompted by the baggage tracking engine 422. The door lock is unlocked when a transport vehicle arrives near the door 506 of the kiosk. The printer can be activated by the kiosk system 502 to print out a ticket or receipt for the user when the user has successfully received or stored their baggage item. The server 400 is configured to determine if the baggage it delivered to the user or stored (as per the user request), and the baggage tracking engine 422 can provide a confirmation message to the kiosk system 502. The kiosk system 502 is configured to control the printer to print a confirmation.

Still with reference to FIG. 6b the mobile device may comprise a software application 702 that includes computer readable instructions. The application 702 allows a user to interact with the server 400. In particular user requests are provided to the engine 422 and confirmation messages are transmitted back to the application 702. The application 702 may be used to allow a user to communicate with the kiosk 500 and kiosk system 502 as an alternative gateway to access the server 400.

Figure 8:
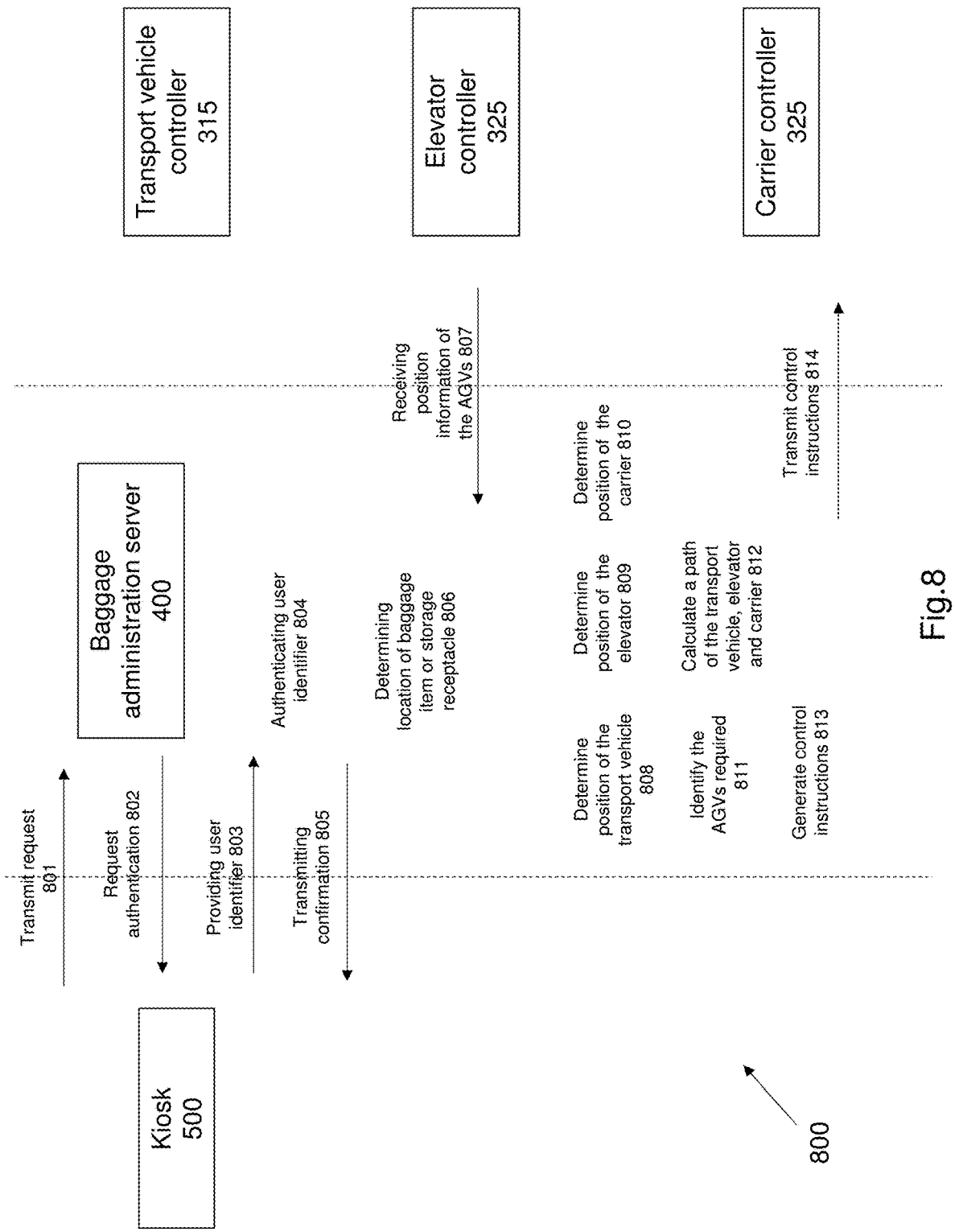
FIG. 8 illustrates a method of baggage management executed by components of the baggage management server.

FIG. 8 illustrates a method of baggage management 800 executed by the baggage management system 100 and its components. FIG. 8 illustrates the data flow between the kiosk 500, the baggage administration server 400 and the AGVs (transport vehicle 310, elevator 320 and carrier 330). In particular FIG. 8 illustrates the communication between the server 400 and the controllers of the AGVs (315, 325, 336). The method 800 begins with step 801. Step 801 comprises the kiosk 500 (or user device 700) transmitting a request to the baggage administration server 400. The request comprises a request to store a baggage item or retrieve a baggage item from the storage rack. If the request is for retrieval then the request will include a baggage identifier. Step 802 comprises the server 400 transmitting to the kiosk 500 (or user device 700) a request for authenticating the user. The system 100 can only be used by authenticated users. For example in a hotel only customers of the hotel can use the baggage management system.

Step 803 comprises the kiosk 500 transmitting a user identifier to the server 400. The user identifier may be a user name or may be a code e.g. a barcode or QR code. As a further alternative the user identifier may be biometric information about the user. The kiosk 500 may comprise a scanner to scan a code or a biometric scanner. Alternatively, if the user is using their mobile device 700 and application 702, the mobile device camera can be used as a scanner or an inbuilt QR code/barcode scanner may be user.

Step 804 comprises the server 400 authenticating the user. Step 804 is performed by the server using instructions within the baggage tracking engine 422. Step 804 may comprise checking the user identifier with authorised user identifiers within the user database 432. The user will preferably undergo a registration process where the user registers their name, address and other information with the server 400. The user information is stored in the user database 432. The server 400 may generate a unique code associated with the user and send this to the user e.g. a QR code. The user code i.e. user identifier is stored in the database and can be used to authenticate the user. The user identifier comprises information that can be used to identify the user.

Step 805 comprises transmitting a confirmation of authentication (or an error message) to the kiosk 500 or user device 700 for display to the user. The server 400 executes step 806 following authentication. If the user is not authenticated the method 800 is terminated and an error is provided and presented to the user. Step 806 comprises determining the location of the baggage item or free receptacle. The baggage item identifier is accessed from the baggage database 430. The baggage database 430 stores identities of baggage items, associated user and the location of the baggage item within the storage rack 200.

Step 807 comprises the server 400 receiving position information of the AGVs. Step 807 may be continuously performed regardless of if the other steps are being performed. The server 400 continuously monitors the position of the AGVs. The one or more transport vehicles transmit their own positions determined by the position sensor or sensors onboard each transport vehicle. The server 400 may store a map of the area of the baggage management system. For example the server 400 may comprise a map of the area between the storage rack and the kiosk. The kiosk functions as the pick up and drop off point. The area may be mapped as a grid or using a local coordinate system or using a GPS system. The transport vehicles transmit their position information as they move around between the rack 200 and the kiosk 500. The server 400 further is configured to receive and track the position of the elevator relative to the rack 200 using information from sensor 327 of the elevator. The server 400 can determine which level of the rack the elevator is at. Similarly, the server 400 is configured to receive and track the position of each carrier of the rack 200 using sensor 335.

Step 808 comprises the server 400 determining the position of the one or more transport vehicles based on the received position information. Step 809 comprises the server 400 determining the position of one or more elevators based on the received position information of the elevator. Step 810 comprises the server 400 determining the position of the one or more carriers of the rack based on received position information.

Step 811 comprises the server 400 identifying the AGVs required to complete the request. For example the server 400 is configured to determine the transport vehicle 310, the elevator 320 and the carrier 330 required to move to complete the request. This is achieved by the instructions stored in the baggage tracking engine 422 or the baggage movement coordinator 420. Step 812 comprises calculating the path the identified AGVs are required to travel to complete the request. The server 400 uses logic and instructions within the baggage coordinator 422 to calculate mathematically a path the transport vehicle has to travel between the kiosk 500 and the rack 200 to complete the request. The calculated path is the fastest path and avoid collisions with other transport vehicles. The server 400 may be configured to calculate future paths of other transport vehicles and use this information to avoid collisions in the calculated path for the identified transport vehicle. Similarly the server 400 calculates the path the elevator has to travel i.e. the elevator moving between a ground level and a calculated level. The server 400 also calculates the path an identified carrier has to travel along the rail of the rack 200.

Step 813 comprises generating control instructions by the server 400. The control instructions may be generated by the baggage movement coordinator 420. The control instructions comprise instructions that can be executed by the controllers of the transport vehicle 310, elevator 320 and the carrier 330 to cause these AGVs to move. The control instructions comprise movement path calculated as well instructions to handle exceptions and avoid collisions. Step 814 comprises transmitting the control instructions to the controllers 315, 325, 336 respectively. The control instructions may be constantly updated and updated instructions may be constantly transmitted. Alternatively the server 400 may transmit control instructions to the specific AGV that is required to be moved. The specific AGV being identified based on the position of the other AGVs. Each AGV may comprise additional sensors that detect if a baggage item is received on the AGV. This information is transmitted to the server 400 which can use this information to track the position of the baggage item.

Figure 9:
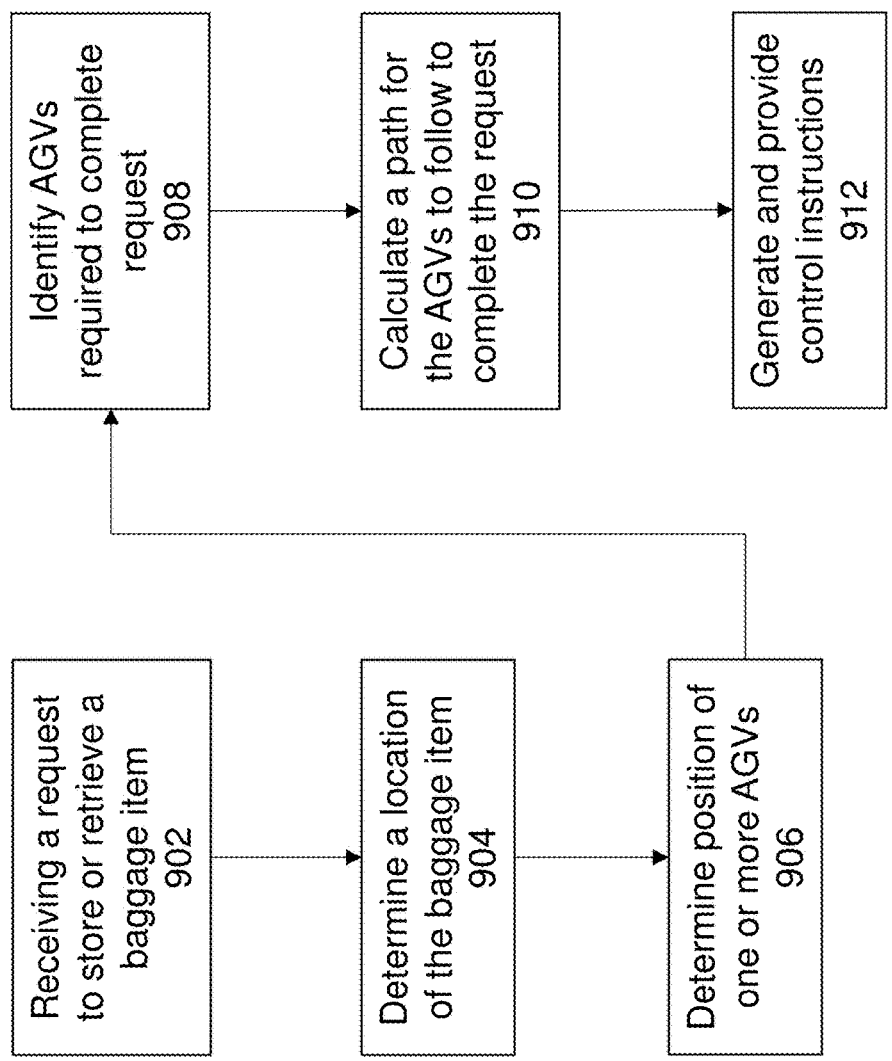
FIG. 9 illustrates a method of baggage management executed by the baggage administration server.

FIG. 9 illustrates an example method of baggage management 900 executed by the baggage administration server 400. The method 900 is a generalised method executed by the server 400 using the instructions from the computer programs 420, 422. Step 902 comprises receiving a request, from a kiosk or mobile device, to store or retrieve a baggage item. Step 904 comprises determining the location of the baggage item and/or determining a free storage receptacle within the storage rack. Step 906 comprises determining the position of one or more automated guided vehicles relative to the storage rack, wherein the automated guided vehicles are used to store or retrieve a baggage item. Step 908 comprises identifying the AGVs that are to be recruited to store or retrieve the baggage item defined in the request. Step 910 comprises calculating a path the identified AGVs are required to follow to either store or retrieve a baggage item as defined in the request. Step 912 comprises providing control instructions to a controller of each of the identified AGVs to cause the AGVs to store or retrieve a bag as defined in the request. The method 900 can be part of method 800 and illustrates the specific actions performed by the server 400.

Figure 10K:
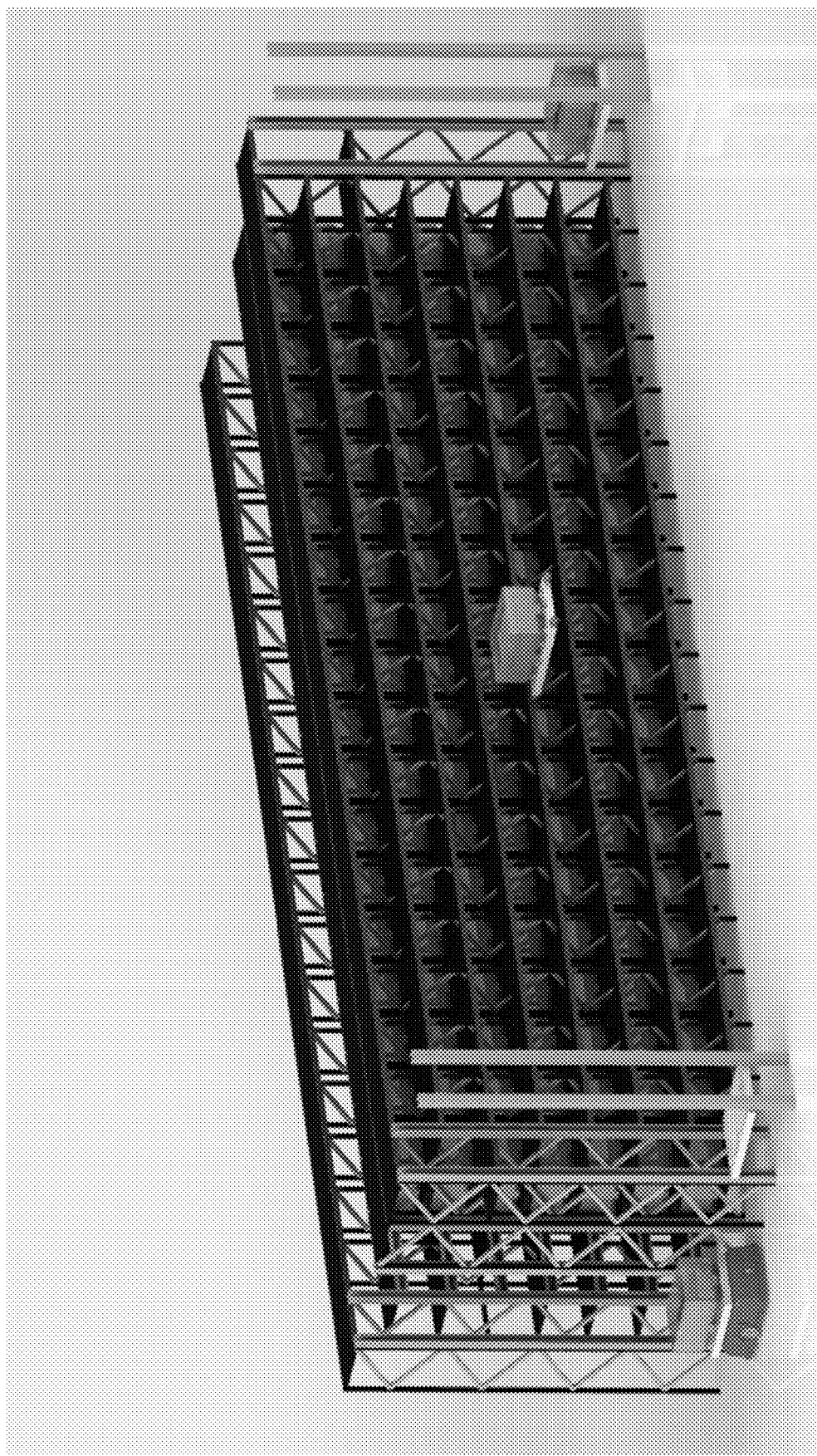
FIG. 10K illustrates a method of storing a baggage item using a baggage management system.

FIGS. 10*a* to 10*k* illustrate one use case of the baggage management system 100 and management method 800. Referring to FIG. 10*a* a user inputs a request to store or retrieve a baggage item 10. In the illustrated example the user inputs a request to store a baggage item 10 at the kiosk 500. The request is transmitted to the server 400 and the kiosk displays a request to authenticate. A user authenticates on the kiosk 500 as shown in FIG. 10*b*. The server 400 identifies a pick of the baggage item is required from the kiosk. The server 400 identifies a transport vehicle i.e. an autonomous robot 310 that is free and can pick up the baggage item 10. The server 400 provides control instructions to the vehicle 310 with a path to reach the kiosk. The controller 315 of the vehicle 310 is configured to execute the control instructions and follow the set path and arrive at the kiosk 500 as shown in FIG. 10*b*. The transport vehicle 310 includes an empty carrier box 340 on the transport vehicle 310. The vehicle 310 brings the carrier box to the kiosk to receive the baggage item 10.

A door 506 may be opened when the vehicle 310 arrives at the kiosk 500. The kiosk 500 serves as a pick up/drop off point. The door may be optional and is a lockable door. The user places the baggage item 10 in the carrier box 340. The user may provide a confirmation that bag is loaded onto the vehicle 310 via the kiosk. The kiosk system 502 is configured to actuate and close a door 506. The door 506 may separate a baggage storage area from the rest of the area where users can move freely. The baggage storage area includes multiple transport vehicles 310 moving freely therein. For safety reasons the door is closed and locked by a door lock 508 when the baggage item 10 is loaded in the carrier box 340. As shown in FIG. 10*c* the transport vehicle 310 moves in the direction of the arrow shown. The vehicle 310 receives further updated control instructions once the baggage item is loaded into the carrier box.

The carrier box 340 is locked to the platform 314 of the transport vehicle 310. The vehicle controller 315 is configured to activate the locks 314*a* to lock the carrier box to the platform 314. The carrier box 340 is locked to the vehicle platform 314 during transport to prevent the baggage item 10 from falling off. The locks 314 are unlocked, as shown in FIG. 10*e*, when the transport vehicle 310 arrives adjacent the elevator 320. The locks may be disengaged based on the determined position of the vehicle 310 from the position sensor data. The controller 315 of the vehicle may determine the position and disengage the locks.

The carrier box 340 is transferred from the vehicle platform 314 to the slab 321 of the elevator 320, as shown in FIGS. 10*f* and 10*g*. The rollers 319 on the platform 314 of the transport vehicle 310 are activated by the controller 315 of the vehicle 310. The rollers roll in a clockwise direction to cause the carrier box 340 to move and be transferred to the elevator 320. Once the carrier box 340 is transferred to the elevator 320 from the transport vehicle 310 the transport vehicle 310 may wait near the rack or may receive control instructions to move to a different location e.g. go back to the kiosk to pick up a further baggage item.

The elevator 320 (specifically the elevator controller 325) receives control instructions to move the elevator to a required height i.e. required level of the rack 200. The elevator controller 325 controls the elevator actuator to move the elevator upwardly. The elevator 320 is stopped at the required level by the controller 325 based on the received control instructions. The carrier box 340 is transferred to the carrier 330 as shown in FIGS. 10h and 10i. The elevator 320 is stopped at the required level. The carrier 330 may be moved to the elevator by the carrier controller 336 executing control instructions from the server 400. The rollers 323 on the elevator 320 are actuated by the roller actuator 324. The roller actuator 324 is controlled by the controller 325. The roller 323 roll to transit the carrier box 340 horizontally onto the shelf 331 of the carrier 330.

The carrier 330 is controlled by its controller to move to a specified receptacle 206 based on received control signals. The carrier 330 is stopped at the specified receptacle 206. The carrier box is transferred into the receptacle. The rollers 337 of the carrier are activated to roll thereby causing the carrier box 340 to be moved i.e. translated. The universal bearings further help to move the carrier box and reduce friction. Each receptacle may comprise a push pull effector e.g. a pair of arms that can extend and contract. The carrier box 340 and baggage item 10 is transferred into the receptacle as shown in FIGS. 10i and 10j. FIG. 10j shows the baggage item pushed into the receptacle 206.

The carrier 330, elevator 320 and transport vehicle 310 movement is controlled by their respective controllers based on received movement instructions. The controllers of the carrier 330, elevator 320 and transport vehicle 310 control their respective actuators to cause movement of these AGVs. FIG. 10k illustrates the carrier 330 is configured to move horizontally relative to the rack, the elevator 320 is configured to move vertically along the rack and the transport vehicle 310 is configured to move between the rack and the kiosk or other pick up/drop off point.

The baggage management system 100 disclosed herein provides an automated baggage management system. The system automatically collects baggage items, stores them in a receptacle and can also automatically retrieve baggage items from the receptacle. The baggage management system comprises a rack that is expandable thereby allowing for increased capacity. The baggage items are stored and retrieved by using AGVs which reduces the need for humans moving around within the system. This improves safety, efficiency and can be a faster way of storing and retrieving baggage items. The automated system uses an elevator and carriers attached to the rack for fast and efficient transfer of baggage to receptacles in the rack and removal of baggage items. The use of the automated elevator and carrier at each level remove the need for a human using a ladder or lift thereby improving speed and safety. The system includes a carrier at each level which leads to improved efficiency in storing and retrieval of baggage items from the rack.

The baggage administration server manages and coordinates the movement of all the AGVs of the system. This is advantageous because the server automatically coordinates the movement of the transport vehicles 310 along a calculated path that avoids collisions with other transport vehicles. Further the calculated path of each transport vehicle 310 is the most efficient path between the rack 200 and the pick up/drop off point (e.g. the kiosk). This automated path calculation is advantageous because the path is the fastest path to pick up or retrieve a baggage item and avoids collisions. The baggage management system provides a more adaptable solution due to the free movement of the transport vehicles 310. This allows for a large area to be serviced and allows for customised pick up and drop off points as compared to a stationary robot. Further the moveable transport vehicles 310 are advantageous because they can be moved to pick up and retrieve multiple bags. The system 100 is advantageous because it provides an automated system that can be expanded and allows multiple bags to be stored or retrieved.

Figure 12:
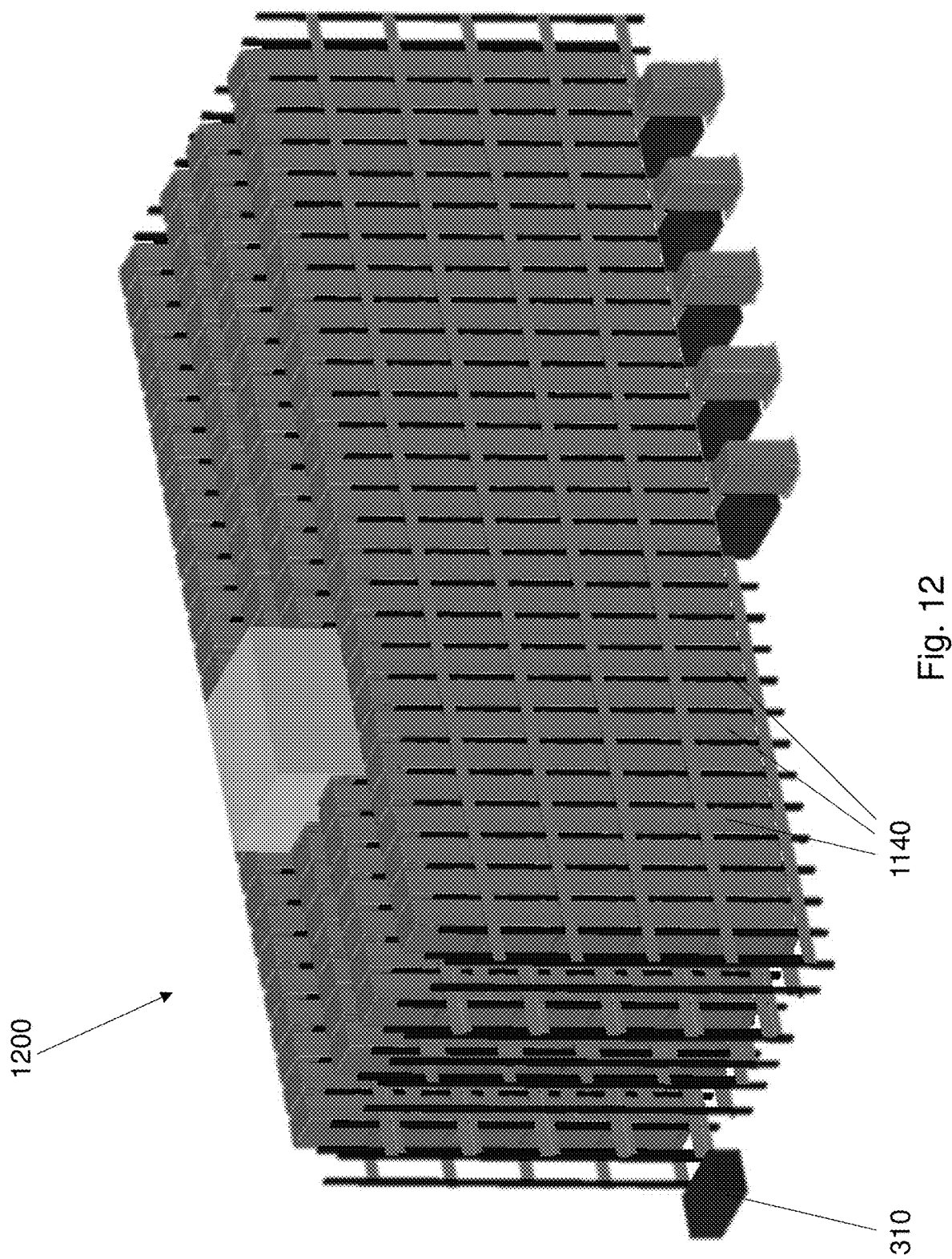
FIG. 12 illustrates an alternative embodiment of a storage rack of the baggage management system.

With reference to FIGS. 11a and 11b, there is shown an alternative embodiment of the carrier box 1140 which may be similar handled by the rack 200 (or rack 1200 as shown in FIG. 12) and the transport vehicles 310 in the previous embodiments. In this example, unlike the tray-like carrier box 340, the carrier box 1140 includes a door or a pair of doors 1142 which may close the carrier box 1140, such that the luggage or any item contained in the carrier box 1140 is protected from external damages during the transportation of the luggage. Additionally or optionally, the door may be spring-biased to fully open such that the luggage 10 or stored items may be more easily stored and retrieved when the doors are unlocked.

Referring to FIG. 12, there is shown another embodiment of the rack 1200 which may be suitable to store a plurality of carrier box 1140. In this embodiment, the carrier box 1140 may be more closely pack with respect to each other since the boxes 1140 may be placed in an upright position, and the contained luggage or items are securely maintained within each of the carrier boxes 1140 since all of the boxes on the rack 1200 are closed and locked by the doors. Advantageously the rack 1200 and carrier boxes 1140 further enhances the utilization of available space in a storage area.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

Although not required, the embodiments described with reference to the Figures can be implemented as an Application Programming Interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

As used herein, the term "and/or" includes any and all possible combinations or one or more of the associated listed items, as well as the lack of combinations when interpreted in the alternative ("or").

The invention claimed is:

1. A baggage management system comprising:
   a storage rack for storing baggage;
   the storage rack including a plurality of vertical columns, horizontal rails connected to and extending perpendicular to the vertical columns and a plurality of receptacles formed along the horizontal rails, each receptacle shaped and structured to retain one or more baggage items;
   a baggage transportation system comprising:
      one or more automated guided vehicles (AGVs), the automated guided vehicles (AGVs) being configured to transport one or more baggage items between a pick up point, a drop off point and the storage rack;
      each AGV comprising a controller and a wireless communication unit configured for wireless communication and wherein the controller of each AGV is configured to control movement of the AGV based on received control instructions;
   a baggage administration server comprising: a processor, a memory unit and a wireless communication interface, the baggage administration server configured to:
      receive a request to store or retrieve a baggage item from the storage rack,
      determine the position of the one or more AGVs,
      identify the one or more AGVs required to either store or retrieve a baggage item as defined in the request
      transmit the control instructions to the one or more AGVs, the control instructions defining movement instructions for one or more the AGVs, the movement instructions defining actions of the one or more AGVs to store or retrieve a baggage item as specified in the request; and
   the controller of the one or more AGVs receiving the control instructions, executing the control instructions and causing the one or more AGVs to store or retrieve the baggage item as defined in the request,
   wherein the one or more AGVs comprise:
   an elevator coupled to the storage rack and configured to move vertically relative to the storage rack;
   a carrier coupled to the storage rack and configured to move horizontally relative to the storage rack; and
   a transport vehicle configured to travel between a pick up and/or drop off point and the storage rack,
   wherein the transport vehicle comprises:
   a chassis;
   a pair of wheels;
   a motor coupled to the wheels, the motor configured to drive the wheels;
   a vehicle controller in electronic communication with the motor; and
   a platform attached to the chassis, the chassis supporting the platform,
   wherein the transport vehicle further comprises a lock on the platform, the transport vehicle adapted to receive a carrier box on the platform, and in use, the lock is configured to lock the carrier box to the platform and unlock the carrier box from the platform such that the carrier box is moveable relative to the platform.

2. A baggage management system in accordance with claim 1, wherein the transport vehicle is freely moveable, and the transport vehicle is configured to carry one or more baggage items and transport the one or more baggage items between the pick up and/or drop off point and the storage rack.

3. A baggage management system in accordance with claim 1, wherein the elevator is coupled to the storage rack, the elevator is further configured to receive one or more baggage items from the transport vehicle or from the carrier, and the elevator is further configured to travel vertically along the storage rack parallel to a vertical column of the storage rack to transport the one or more baggage items vertically along the storage rack.

4. A baggage management system in accordance with claim 1, wherein the elevator comprises:
   a slab;
   an elevator actuator;
   a lift mechanism, the lift mechanism mechanically coupled to the elevator actuator and coupled to the slab; the lifting mechanism connected to a vertical column of the storage rack;
   the elevator actuator configured to actuate the lift mechanism to cause the elevator to move vertically relative to the vertical column of the storage rack;
   a plurality of active rollers disposed on or within the slab, the active rollers being selectively actuated; and
   an elevator controller in electronic communication with the elevator actuator and in wireless communication with the baggage administration server, wherein the elevator controller is configured to receive control instructions from the baggage administration server and execute the control instructions to cause the elevator to move vertically along the storage rack to a specified position.

5. A baggage management system in accordance with claim 1, wherein the baggage administration server comprises:
   a baggage movement coordinator comprising a computer program saved on a memory unit of the baggage administration server, the computer program being executed by the processor,
   wherein the baggage movement coordinator is configured to:
      determine the position of the AGVs,
      determine a path the AGVs are required to follow to either store or retrieve a baggage item as defined in the request,
      generate control instructions to be transmitted to the AGVs to cause the AGVs to move along the determined path to store or retrieve the baggage item as defined in the request,
   the control instructions being transmitted to the AGV controllers by the wireless communication interface of the baggage administration server.

6. A baggage management system in accordance with claim 1, wherein the baggage administration server further comprising:
   a baggage tracking engine, the baggage tracking engine being stored in the memory unit of the baggage administration server and executed by the processor of the baggage administration server, wherein the baggage tracking engine includes instructions executable by the processor of the baggage administration server to cause the baggage administration server to execute the steps of:

receiving a request to store or retrieve a baggage item from a user, check if the user is an authorized user by checking an authorized user database, locating the baggage item from a baggage database of stored baggage items, identifying the storage receptacle at which the baggage item is located at or identifying an unused storage receptacle in the storage rack, providing storage receptacle identity to the baggage movement coordinator to generate control instructions.

7. A baggage management system in accordance with claim 1, wherein the carrier is coupled to the storage rack, the carrier is further configured to receive the one or more baggage items from the elevator, and the carrier is further configured to travel horizontally along the storage rack parallel to a horizontal rail and transport the one or more baggage items horizontally along the storage rack.

8. A baggage management system in accordance with claim 7, wherein the carrier is configured to unload the one or more baggage items into a specified storage receptacle.

9. A baggage management system in accordance with claim 1, wherein the carrier box is configured to receive one or more baggage items within the carrier box.

10. A baggage management system in accordance with claim 9, wherein the carrier box comprises a length of between 700 mm to 900 mm, a width of between 300 mm to 700 mm and a height of between 250 mm to 350 mm.

11. A baggage management system in accordance with claim 1, wherein the baggage management system comprises:

a kiosk comprising a user interface, a wireless communication unit, a kiosk processor and a memory unit, the kiosk configured to:

receive, via the user interface, a request to store or retrieve a baggage item from a user, process the request and determine if the user is an authorized user, if the user is an authorized user, present acceptance of the request on the user interface, and if the user is not an authorized user, present an error on the user interface.

12. A baggage management system in accordance with claim 11, wherein the kiosk comprises a camera and a printer, the camera configured to capture an image of the baggage item and the printer configured to print a receipt or docket in response to a user being recognized as an authorized user.

13. A baggage management system in accordance with claim 1, wherein the transport vehicle comprises a plurality of rollers disposed on or embedded within the platform, the rollers coupled to a roller actuator, the roller actuator configured to actuate the rollers and cause the rollers to roll, wherein the roller actuator is in electronic communication with the vehicle controller, and in use, the vehicle controller is configured to activate the roller actuator to cause the rollers to roll, and wherein the rollers rolling cause the carrier box to move relative to the platform.

14. A baggage management system in accordance with claim 13, wherein the transport vehicle further comprises one or more proximity sensors and one or more location sensors, and wherein the proximity sensors and the location sensors are in electronic communication with the vehicle controller.

15. A baggage management system in accordance with claim 14, wherein the vehicle controller is configured to determine a location of the vehicle based on the one or more location sensors and/or based on the one or more proximity sensors, and the vehicle controller is configured to activate the roller actuator to cause the rollers to roll when the vehicle is determined to be adjacent the elevator to transfer the carrier box from the platform to the elevator; and the vehicle controller is configured to wirelessly receive control instructions from the baggage administration server, and the vehicle controller is configured to control the motor based on executing the control instructions to cause the vehicle to move as defined in the control instructions.

16. A baggage management system in accordance with claim 1, wherein the carrier comprises:

a shelf, a first sliding support connected to a first side of the shelf, a second sliding support connected to a second side of the shelf, the first and second sides are opposing sides of the shelf, each sliding support is engaged to a horizontal rail of the storage rack, a carrier actuator, the carrier actuator mechanically connected to the first sliding support and the second sliding support, wherein the carrier actuator is configured to actuate the sliding supports to cause the carrier to move horizontally relative to the storage rack; and a carrier controller in electronic communication with the carrier actuator and in wireless communication with the baggage administration server, the carrier controller configured to receive control instructions from the baggage administration server, the carrier controller configured to execute the control instructions to cause the carrier to move horizontally to a specified position along the storage rack.

17. A baggage management system in accordance with claim 16, wherein the shelf comprises a plurality of active rollers and a plurality of ball bearings disposed on or embedded within the shelf, the active rollers being selectively actuated to cause a baggage item to be moved off the shelf.

18. A baggage management system in accordance with claim 16, wherein the storage rack comprises one or more electrical chargers located at an end of each horizontal rail of the storage rack and one or more electrical chargers located at an end of each vertical column, the one or more electrical chargers on the horizontal rail configured to charge the carrier actuator and the one or more electrical chargers on the vertical column configured to charge the elevator actuator.

19. A method for baggage management, the method steps being executed by a baggage administration server, the method comprising the steps of:

receiving a request, from a kiosk or a mobile device, to store or retrieve a baggage item, determining the location of the baggage item and/or determining a free storage receptacle within a storage rack, determining the position of one or more automated guided vehicles (AGVs) relative to the storage rack, wherein the one or more AGVs are used to store or retrieve a baggage item, identifying the one or more AGVs that are to be recruited to store or retrieve the baggage item defined in the request, calculating a path the identified AGVs are required to follow to either store or retrieve a baggage item as defined in the request, providing control instructions to a controller of each of the identified AGVs to cause the identified AGVs to store or retrieve a bag as defined in the request, wherein the step of calculating a path comprises determining the fastest path to store or retrieve a baggage item to complete the request and determining paths of other AGVs to avoid collisions.

20. A method for baggage management in accordance with claim 19, wherein the method further comprises the additional steps of:

authenticating a user as an authorised user, storing the authorised user identity in a user database, receiving identity of one or more baggage items associated with the user, storing the identity of the one or more baggage items associated with the user in a baggage database, and updating the user database and baggage database following the steps of receiving the request and authenticating a the user.

21. A method for baggage management in accordance with claim 19, wherein the step of calculating a path and transmitting control instructions are performed in real time or at regular time intervals.

22. A method of baggage management, the method being executed by a baggage management system, the baggage management system comprising a baggage administration server, a storage rack, a plurality of automated guided vehicles (AGVs) and a kiosk for user interaction, the method comprising the steps of:

receiving a request for storing or retrieving a baggage item from a user at the kiosk;

the kiosk in wireless communication with the baggage administration server via a wireless communication network;

receiving the request for storing or retrieving a baggage item at the baggage administration server;

sending, by the server, an authentication request to the kiosk;

the kiosk presenting an authentication request to the user;

receiving and transmitting a user identifier to the baggage server by the kiosk;

the baggage administration server configured to check the user identifier with a user database storing authenticated users and associated user identifiers;

the baggage administration server configured to authenticate the user;

determining, by the baggage administration server, a location of the baggage item if the request is a retrieval request or determining the location of a free receptacle in the storage rack;

determining, by the baggage administration server, a position of one or more transport vehicles;

determining, by the baggage administration server, a position of an elevator relative to the storage rack;

determining, by the baggage administration server, a position of a carrier relative to the storage rack;

identifying, by the baggage administration server, the transport vehicle required to complete the request;

calculating a path of the identified transport vehicle, elevator and carrier to complete the request, by the baggage administration server, wherein the path comprises the fastest path of movement for the transport vehicle, carrier and elevator to avoid collisions and complete the request;

generating control instructions, by the baggage administration server, defining movement instructions for the transport vehicle, elevator and carrier;

transmitting the control instructions, by the baggage administration server, to a controller of the transport vehicle, a controller of the elevator, and a controller of the carrier;

the transport vehicle controller, the elevator controller and the carrier controller executing the control instructions received from the baggage administration server, and the transport vehicle, elevator and carrier moving as defined in the control instructions to complete the request.

* * * * *